US010535256B1

(12) United States Patent
Lim et al.

(10) Patent No.: US 10,535,256 B1
(45) Date of Patent: Jan. 14, 2020

(54) METHOD AND APPARATUS FOR TRAFFIC-AWARE STOCHASTIC ROUTING AND NAVIGATION

(75) Inventors: Sejoon Lim, Cambridge, MA (US); Hari Balakrishnan, Belmont, MA (US); David Kenneth Gifford, Weston, MA (US); Samuel R. Madden, Boston, MA (US); Daniela Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 130 days.

(21) Appl. No.: 12/419,020

(22) Filed: Apr. 6, 2009

(51) Int. Cl.
*G08G 1/01* (2006.01)

(52) U.S. Cl.
CPC .................. *G08G 1/0104* (2013.01)

(58) Field of Classification Search
CPC ....... G01C 21/30; G01C 21/34; G08G 1/0104
USPC ..... 701/23–28, 117–123, 200–226; 340/907, 340/909–943, 988–996
See application file for complete search history.

(56) References Cited

U.S. PATENT DOCUMENTS

| 6,615,130 B2 * | 9/2003 | Myr | G01C 21/3492 |
| | | | 340/988 |
| 6,690,292 B1 * | 2/2004 | Meadows | G08G 1/0104 |
| | | | 340/905 |
| 7,755,509 B2 * | 7/2010 | Bespalov | G08G 1/0104 |
| | | | 340/905 |
| 8,731,821 B2 * | 5/2014 | Sheynblat | G01C 21/3679 |
| | | | 701/400 |
| 2008/0025222 A1 * | 1/2008 | Nikolova | H04L 45/12 |
| | | | 370/238 |

OTHER PUBLICATIONS

Brakatsoulas et al. "on Map-Matching Vehicle Tracking Data." Proceedings fo the 31st VLDB Conference, Trondheim, Norway, 2005.*
Flinsenberg. "Route planning algorithms for car navigation." Eindhoven: Technische Universiteit Eindhoven, 2004. Proefschrift. ISBM 90-386-0902-7 NUR 919.*

(Continued)

*Primary Examiner* — Fonya M Long
*Assistant Examiner* — Kristine K Rapillo
(74) *Attorney, Agent, or Firm* — Anderson Gorecki LLP

(57) ABSTRACT

In some embodiments, a method of providing a user with a roadway route to a destination that maximizes the probability of reaching the destination by a deadline includes providing a database of traffic delay probability distributions based on historical traffic delay information, performing route-planning using at least one of the traffic delay probability distributions and parametric optimization to determine at least one route to the destination that maximizes the probability of reaching the destination by the deadline, and displaying the at least one route to the user. In some embodiments, the database includes a mean value and a variance value associated with each route from a plurality of routes stored at the database, and the performing includes the following steps: defining a first set of routes from the plurality of routes, selecting a first route from the plurality of routes as a current optimal route, defining a second set of routes and a third set of routes based on the first route, and discarding the second set of routes.

42 Claims, 10 Drawing Sheets

(56) References Cited

OTHER PUBLICATIONS

Flinsenberg, Ingrid C. M. "Route planning algorithms for car navigation." Eindhoven: Technische Universiteit Eindhoven, 2004. Proefschrift.—ISBN 90-386-0902-7 NUR 919. (Year: 2004).*

Brakatsoulas, Sotiris; Pfoser, Dieter; Salas, Randall; Wenk, Carola. "On Map-Matching Vehicle Tracking Data." Proceedings of the 31st VLDB Conference, Trondheim, Norway, 2005. (Year: 2005).*

S. Lim et al., "Stochastic Motion Planning and Application to Traffic", WAFR 2008: The Eighth International Workshop on the Algorithmic Foundations of Robotics, held in Guanajuato, Mexico over Dec. 7-9 2008, pp. 1-16.

S. Lim, "Traffic Prediction and Navigation Using Historical and Current Information", Massachusetts Institute of Technology, Apr. 7, 2008, 104 pages.

E. Nikolova et al., "Optimal Route Planning Under Uncertainty", International Conference on Automated Planning and Scheduling, 2006, 10 pages.

E. Nikolova et al., "Stochastic Shortest Paths via Quasi-Convex Maximization", ESA, 2006, pp. 552-563.

Program or Agenda for WAFR 2008: The Eighth International Workshop on the Algorithmic Foundations of Robotics, held in Guanajuato, Mexico over Dec. 7-9, 2008, as printed from the world wide web at http://www.wafr.org/program.php on Mar. 11, 2009.

* cited by examiner

METHOD AND APPARATUS FOR TRAFFIC-AWARE STOCHASTIC ROUTING AND NAVIGATION

GOVERNMENT SUPPORT

This invention was made with Government support under Grant No. IIS-0426838, awarded by the National Science Foundation. The Government has certain rights in this invention.

TECHNICAL FIELD

The invention generally relates to navigation and more particularly to routing from one location to another in a network, such as along roadways from one street address to another street address, or in a communications network.

BACKGROUND INFORMATION

Motor vehicle traffic congestion occurs in cities and towns in the United States and in other countries around the world. Many automobiles and other motor vehicles have internal combustion engines that burn fuel (whether gasoline or diesel fuel) even when the vehicles are sitting idle in traffic. The effluent from such engines pollutes the environment.

Drivers of motor vehicles often drive sub-optimal routes over public and/or private roadways on the way to their destinations. A driver also will often leave well in advance of a desired arrival time to try to ensure or increase the likelihood of arriving at the desired time, even when being guided along the roadways by a GPS (Global Positioning System) navigation device or when following driving directions from a web service such as MapQuest, Google Maps, Yahoo Maps, or Microsoft Live Maps.

SUMMARY OF THE INVENTION

The invention generally addresses the problem of determining the optimal route to use, and the best time to leave, in order to maximize the likelihood of arriving at the desired destination at a specified arrival time. An algorithm according to the invention takes into account uncertainty of road traffic conditions by stochastic modeling of travel delay on road networks, and the algorithm determines one or more paths between two points that optimize a cost function of the delay probability distribution. A user or driver can then be informed when to leave for the destination and what route(s) to take to maximize the probability of reaching the destination by the desired arrival time. Time is not wasted by leaving too early or in traveling to the destination on a sub-optimal route.

In accordance with the invention, a web site can be made available to provide users with a path or route of travel between two physical locations that maximizes the probability of reaching the destination location by a deadline. Instead of or in addition to a web site, the invention can be or can be contained within a GPS (Global Positioning System) navigation device for use in an automobile or other motor vehicle, as a hand-held or mobile unit while traveling by foot, bicycle, etc., on a boat or ship, in an airplane or other aircraft, etc. The device can be, for example, a wireless cellular phone or a portable or built-in unit such as one designed specifically for use in motor vehicles. Regardless of the way or form in which navigation functionality according to the invention is made available to one or more users, a user is provided with at least one route to the destination that maximizes the probability of reaching the destination by a deadline.

Embodiments according to the invention can involve the use of one or more databases containing traffic delay probability distributions based on historical traffic delay information. A stochastic route-planning algorithm can be employed that accesses and uses at least some of the traffic delay probability distributions and also parametric optimization to determine at least one route to a destination that maximizes the probability of reaching the destination by a given deadline. A user can supply as inputs at least the physical destination location (as, for example, a street address) and the deadline (as a desired arrival time). The stochastic route-planning algorithm according to the invention then uses traffic delay probability distributions and parametric optimization to identify at least one route that maximizes the likelihood of reaching the destination by the specified arrival time. This route can then be displayed to the user on, for example, a screen such as a flat panel or CRT display of a client computer, a touchscreen display of a portable or built-in navigation device, or a cell phone display.

Historical traffic delay information can be obtained in a variety of ways, for example, a system called CarTel that is described in a paper by B. Hull, V. Bychkovsky, Y. Zhang, K. Chen, M. Goraczko, A. K. Miu, E. Shih, H. Balakrishnan, and S. Madden titled "CarTel: A Distributed Mobile Sensor Computing System" and presented at 4th ACM SenSys in Boulder, Colo. in November 2006. Existing traffic delay data from CarTel was organized per road segment to create a historical database of traffic delays on road segments at different times of day. Traffic delay probability distributions (indexed by time-of-day) for all of the road segments were produced using this historical information. The entire road network is modeled as a weighted graph, where the nodes represent intersections and the edges represent road segments. A delay distribution is associated with each road segment in the road network. Another way of obtaining historic information is using commercial products from companies like TeleAtlas (speed profile), Navteq, INRIX, etc. In addition, the delay probability distributions may also be produced using real-time traffic data, or by combining real-time with historic delay data.

The stochastic route-planning algorithm according to the invention solves a graph search problem. The algorithm's objective is to find a path that minimizes an expected cost when the cost function models a user's goal, and this path can be referred to as the optimal path for the given cost function. If the goal is to find the maximum probability path given a deadline, the stochastic route-planning algorithm of the invention finds that path. The stochastic route-planning algorithm uses pruning methods for parametric optimization to efficiently identify the one path (or the few paths) that maximizes the probability of reaching the destination by the given deadline. By using pruning methods for parametric optimization, the stochastic route-planning algorithm of the invention is computationally efficient even with road networks having a very large number of road segments. Known systems that exhaustively enumerate a large number (not polynomial in the size of the network) of possible cases to identify the optimal path are not computationally efficient for road networks of even moderate sizes, and certainly not for road networks having a very large number of road segments as in a typical urban or suburban area in the world. Known approaches using parametric optimization (such as that described in the paper by E. Nikolova et al. titled "Stochastic Shortest Paths Via Quasi-Convex Maximization" on pages 552-563 of *ESA*, 2006) searches only a subset of all the possible enumeration, but still is not practically implementable since the search space with parametric optimization is not polynomial in the size of the network. Our pruning methods for parametric optimization include probing and bounding. The probe-driven parametric optimization compares an arbitrary route representation in a search space with the current optimal route by means of arbitrary function of the mean and variance and determines whether the search region needs to be searched or not. A probe point is a representative point of a region in a search space that can be used to determine whether or not the region is needed to be searched compared with another point such as a current optimal point. A current optimal point is a point in a search space that is currently optimal among the points already found through the process or iteration of the parametric optimization. Using this method, the search space is pruned a lot leading to a polynomial time algorithm. The bound-driven parametric optimization only allows the parameter values that are inside the boundary condition of parameters. By doing this we reduce lots of search space. This pruning technique is the essential part of our algorithm that makes the searching of the best path practically possible.

Some embodiments described herein can be applicable to routing (or path selection) in contexts other than road traffic contexts. For example, some embodiments disclosed herein can be applicable to routing in communications networks such as, for example, packet switching networks. Additionally, some embodiments described herein can be applicable to decision-making contexts. For example, each path can have an associated probability and be related to some decision. The best or optimal path can be the path that maximizes the probability of having at most a maximum price.

As used herein, probe-driven optimization should be understood to mean a method of pruning the search regions of parametric optimization by comparing the probe points to the current optimal route. The method consists of defining one or more probe points in the search space (which is the space of points in the (mean, variance) plane) of possible routes, where these probe points may not correspond to actual routes; defining a region of the search space using the probe points and the point corresponding to the current optimal route, and possibly other lines or points, rejecting all points within the region as "not optimal" without having to explore any other points within the said region. Note that the exploration involves a computationally expensive step of finding a shortest path through the network, so the goal is to reduce the number of these steps.

Bound-driven parametric optimization should be understood to mean a method of pruning regions of parametric optimization by comparing the parameter (lambda) with at least one of the upper and lower bound on the parameters. In some embodiments, the upper and lower bounds are defined in terms of the mean and variance of already found routes through the iteration.

In some embodiments, a best or optimal path can be selected or determined by grouping possible paths into sets (or, in a graphical representation, regions) characterized by, for example, ranges of one or more path parameters (e.g., mean, variance, probability distribution, length, cost, etc.). The sets can be represented by probe or test paths (a probe path related to each set) and an entire set can be removed from consideration for the best path if the probe path cannot be the best path. For example, the best path can be determined by iterating through the possible paths in the sets and defining (or updating) a best current path at each iteration. If a probe point is not better than a current best path, the paths included in the set related to that probe path can be ignored or discarded. If a probe path is better than a current best path, the paths included in the set related to that probe path might be better than the current best path, and those paths can be analyzed (or considered) to determine if a path included in the set is better than the current best path. If the set includes a path that is better than the current best path, that path can be designated as the current best path.

In some embodiments, a method of providing a user with a roadway route to a destination that maximizes the probability of reaching the destination by a deadline includes providing a database of traffic delay probability distributions based on historical traffic delay information, performing route-planning using at least one of the traffic delay probability distributions and parametric optimization to determine at least one route to the destination that maximizes the probability of reaching the destination by the deadline, and displaying the at least one route to the user. In some embodiments, the database includes a mean value and a variance value associated with each road segment from a plurality of road segments stored at the database, and the performing includes the following steps: defining a first set of routes from the plurality of routes, selecting a first route from the plurality of routes as a current best (or optimal) route, defining a second set of routes and a third set of routes based on the first route, and discarding the second set of routes.

In some embodiments, the performing includes defining a first set of routes from a plurality of routes stored at the database, selecting a first route from the plurality of routes as a current best (or optimal) route, and defining a second set of routes and a third set of routes from the plurality of routes based on the first route. In some embodiments, the performing further includes discarding the second set of routes, defining a fourth set of routes and a fifth set of routes from the third set of routes based on the current best route, and discarding the fifth set of routes. For example, to reduce the number of routes analyzed or searched to determine the at least one route. In some embodiments, the method includes receiving, before the performing, a route-planning request from a client via a network, the route-planning request including an origin and a destination, and the displaying includes sending a representation of the at least one route to the client via the network based on an output from the means for performing route-planning.

In some embodiments, a computer-readable medium stores computer-executable program instructions that, when executed, cause one or more computers to perform route-planning using traffic delay probability distributions and parametric optimization to determine at least one route to a destination that maximizes the probability of reaching the destination by a deadline. In some embodiments, the computer-executable program instructions cause one or more computers to define a first set of routes, a second set of routes and a probe route associated with the second set of routes, and discard the second set of routes based on the probe route. The first set of routes can include the at least one route.

In some embodiments, the parametric optimization includes the following steps: performing a first deterministic shortest-path search on a first plurality of routes, defining a second plurality of routes from a first portion of the first plurality of routes based on the first deterministic shortest-path search, defining a third plurality of routes from a second portion of the first plurality of routes based on the first deterministic shortest-path search, discarding the second plurality of routes, and determining the at least one route based on a second deterministic shortest-path search of the third plurality of routes. In some embodiments, the computer-executable program instructions cause one or more computers to define a current optimal path based on boundary conditions of the parametric optimization, define a first set of routes and a second set of routes from a plurality of routes based on the boundary conditions, the first set of routes characterized by a first probe route, the second set of routes characterized by a second probe route, determine that the first set of routes can include a more optimal path than the current optimal path and that the second set of routes cannot include a more optimal path than the current optimal path. The plurality of routes includes the at least one route.

In some embodiments, an apparatus for providing a roadway route to a destination that maximizes the probability of reaching the destination by a deadline includes a memory storing a program, and a processor in communication with the memory, the processor for executing the program and thereby causing the apparatus to perform route-planning using traffic delay probability distributions and parametric optimization to determine at least one route to the destination that maximizes the probability of reaching the destination by the deadline. In some embodiments, the processor causes the apparatus to define a first set of routes from a plurality of routes stored at the memory, select a first route from the plurality of routes, define a second set of routes and a third set of routes from the plurality of routes based on the first route, discard the second set of routes, select a second route from the plurality of routes, define a fourth set of routes and a fifth set of routes from the third set of routes based on the second route, and discard the fifth set of routes to reduce the number of routes searched to determine the at least one path.

In some embodiments, the processor is configured to define a first set of routes, a second set of routes, and a probe route associated with the second set of routes. The processor is further configured to discard the second set of routes based on the probe route and perform a deterministic shortest-path search on the first set of routes. The first set of routes includes the at least one route, and the at least one path is determined based on the deterministic shortest-path search.

In some embodiments, a system for providing a roadway route to a destination that maximizes the probability of reaching the destination by a deadline includes a means for storing traffic delay probability distributions based on historical traffic delay information and a means for performing route-planning using at least one of the traffic delay probability distributions and parametric optimization to determine at least one route to the destination that maximizes the probability of reaching the destination by the deadline. In some embodiments, the parametric optimization includes performing a first deterministic shortest-path search on a first plurality of routes, defining a second plurality of routes from a first portion of the first plurality of routes based on the first deterministic shortest-path search, defining a third plurality of routes from a second portion of the first plurality of routes based on the first deterministic shortest-path search, discarding the second plurality of routes, and determining the at least one route based on a second deterministic shortest-path search of the third plurality of routes.

In some embodiments, the system includes a means for receiving a route-planning request from a client via a network and for providing a representation of the at least one route to the client via the network based on an output from the means for performing route-planning. In some embodiments, the means for performing route-planning is operable to define a first set of routes, a second set of routes, and a probe route associated with the second set of routes, the first set of routes including the at least one route, the first set of routes and the second set of routes stored at the means for storing traffic delay probability distributions, discard the second set of routes based on the probe route, and perform a deterministic shortest-path search on the first set of routes, the at least one path determined based on the deterministic shortest-path search.

In some embodiments, a computerized navigation system includes a database of historical traffic delay information including traffic delay probability distributions, a route-planning subsystem that accesses at least some of the information in the database to determine at least one route to a destination that maximizes the probability of reaching the destination by a deadline, the route-planning subsystem performing stochastic path planning by using at least one of the traffic delay probability distributions and parametric optimization to determine the at least one route, and a user interface subsystem that allows a user to identify at least the destination and the deadline and that displays the at least one route to the user. In some embodiments, the stochastic path planning includes performing a first deterministic shortest-path search on a first plurality of routes stored at the database, defining a second plurality of routes from a first portion of the first plurality of routes based on the first deterministic shortest-path search, defining a third plurality of routes from a second portion of the first plurality of routes based on the first deterministic shortest-path search, discarding the second plurality of routes, and determining the at least one route based on a second deterministic shortest-path search of the third plurality of routes.

In a particular embodiment, a method of providing a user with a roadway route to a destination that meets a user defined criteria includes providing a database of traffic delay probability distributions over at least one road segment obtained from at least one of historic traffic delay information and real-time information. The method further includes using the traffic delay probability distributions together with probe-driven parametric optimization for determining at least one route to the destination that meets the user defined criteria, wherein the probe-driven parametric optimization includes defining one or more probe points in a search space of possible routes, defining a region of said search space using said probe points, and rejecting all points within said region as non-optimal without having to explore other points within said region by comparing said probe points with a current point corresponding to at least one current optimal route. The method additionally includes performing at least one of presenting the at least one route contained within the non-rejected region to the user and storing the at least one route in a data structure.

BRIEF DESCRIPTION OF THE DRAWINGS

A fuller understanding of various aspects, objects, features, and advantages of certain embodiments according to the invention will be obtained and understood by considering the accompanying drawings, which primarily illustrate the principles of the invention and embodiments thereof and are not necessarily to scale. In the drawings, like reference characters generally denote corresponding or related items. The drawings and the disclosed embodiments of the invention are exemplary only and are not limiting on the invention.

DESCRIPTION

Figure 1:
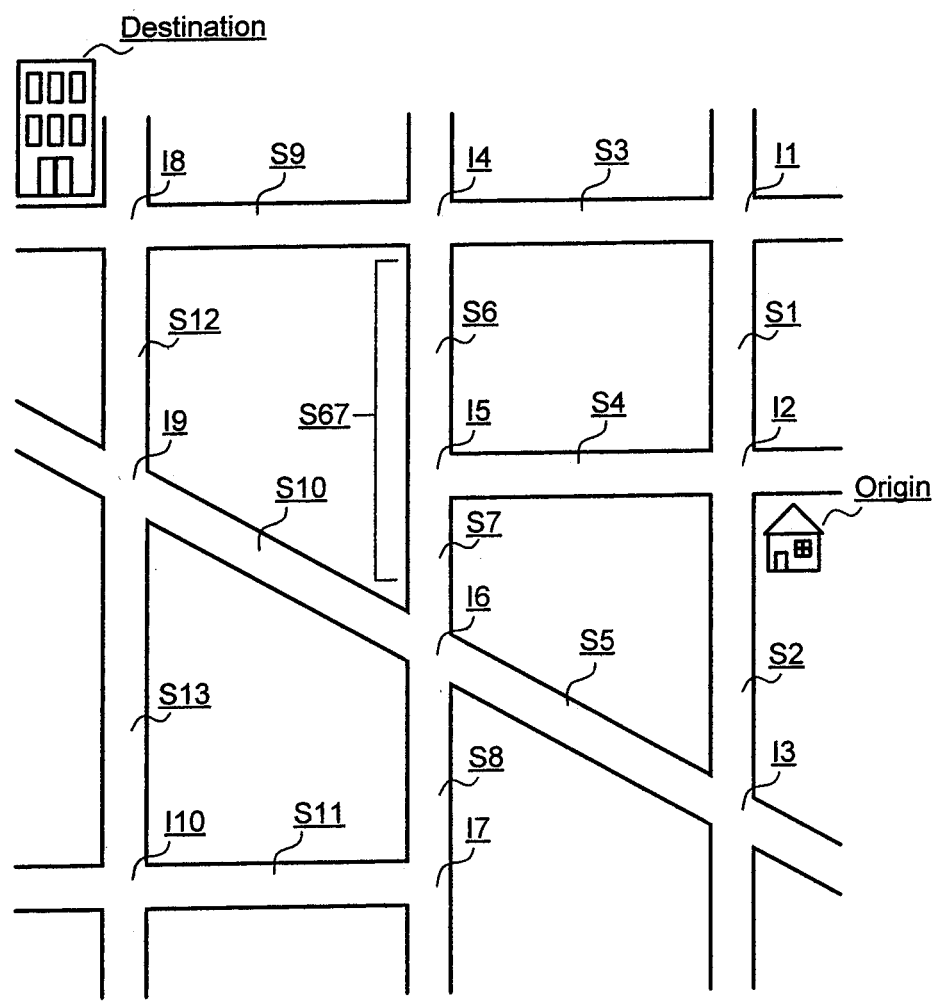
FIG. 1 is a schematic diagram of a portion of a traffic system including an origin and destination, according to an embodiment.

FIG. 1 is a schematic diagram of a portion of a traffic system including an origin and destination, according to an embodiment. As illustrated in FIG. 1, a traffic system can include numerous streets, street segments, and intersections. For example, FIG. 1 includes street segments S1-S13 and intersections I1-I9. A street can include one or more street segments. For example, a street can include street segments S9, S3, and other street segments (not shown). In some embodiments, multiple street segments can be included in (or define) a street segment. For example, a street can include street segments S6, S7, S8, and other street segments (not shown); and street segments S6 and S7 can define street segment S67. Said differently, street segment S67 can include street segments S6 and S7 and a street can be defined from street segments S8, S67, and other street segment (not shown). In some embodiments, a street can be defined from a single street segment.

As illustrated in FIG. 1, a traffic system can define (or include) numerous routes (or paths) between an origin and a destination. Routes (or paths) can include street segments and intersections. For example, the traffic system illustrated in FIG. 1 includes a route from Origin to Destination defined by intersection I2, street segment S1, intersection I1, street segment S3, intersection I4, street segment S9, and intersection I8. That is, I2, S1, I1, S3, I4, S9, and I8 define a route (or path) from Origin to Destination. In some embodiments, intersections can be implicit in a route (or path), but not included in a definition of the route (or path). Said differently, in some embodiments, a path can be defined (or based on) street segments without reference to intersections, even though the route includes intersections. The intersections of the route are implicit because street segments are joined or linked by intersections. For example, the traffic system in FIG. 1 includes a route from Origin to Destination defined by S2, S5, S10, and S12. The intersections, I3, I6, and I9 are implicit in the route because these intersections link S2 to S5, S5 to S10, and S10 to S12, respectively.

A person navigating from, for example, Origin to Destination can generally use or follow any of the numerous paths from Origin to Destination. However, various factors such as, for example, road repairs, traffic accidents, traffic congestion, traffic signals, pedestrian traffic, retail districts, and other traffic conditions can affect travel time from Origin to Destination along each of the paths from Origin to Destination. Thus, some paths from Origin to Destination are faster than other paths from Origin to Destination.

The travel time along any path from Origin to Destination can vary based on numerous factors including, for example, time of the day, time of the year, day of the week, occurrence of a special event, and other factors. Said differently, the travel time of a path from Origin to Destination can vary. That is, the travel time of a path from Origin to Destination is typically not static. In other words, the travel time of a path from Origin to Destination can be affected by various events and/or factors such that the travel time of that path is random. Furthermore, the travel time across any street segment, intersection, and/or street included in that path can also vary, or be random.

A travel time along a path from Origin to Destination can be modeled statistically and/or probabilistically. That is, despite the random nature of the travel time along any path from Origin to Destination, the travel time along a particular path (or street segment, intersection, and/or street included in that path) from Origin to Destination is typically within a range of values that can be defined in terms of a probability. In other words, the travel time along a path from Origin to Destination can be defined as a probability distribution with a mean and a variance. Said differently, the travel time along a path from Origin to Destination can be parameterized or defined (or described) in terms of parameters (e.g., probability distribution, mean, variance, and/or other parameters). For example, the travel time along a path from Origin to Destination can be defined as a Gaussian probability distribution with a mean of 52 minutes and a variance of 8 minutes-squared. In some embodiments, a traffic system can be modeled and/or analyzed based on such parameters.

Figure 2:
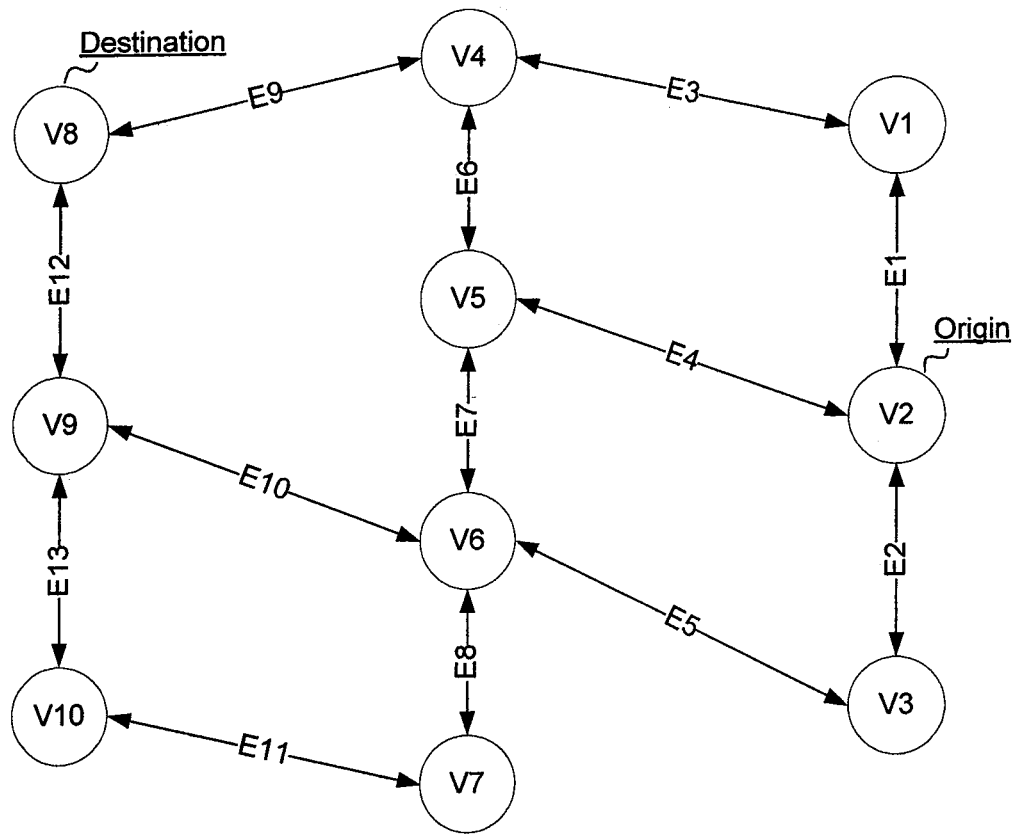
FIG. 2 is an illustration of a graph representing the portion of the traffic system of FIG. 1, according to an embodiment.

FIG. 2 is an illustration of a graph representing the portion of the traffic system of FIG. 1, according to an embodiment. The graph illustrated in FIG. 2 includes vertices (or nodes) V1-V10 and edges E1-E13. The vertices V1-V10 correspond to (or are associated with) intersections I1-I10 of the traffic system illustrated in FIG. 1. Similarly, edges E1-E13 correspond to (or are associated with) street segments S1-S13 of the traffic system illustrated in FIG. 1. The graph illustrated in FIG. 2 can be used to model the traffic system illustrated in FIG. 1.

In some embodiments, various parameters can be assigned to (or associated with) each edge of the graph illustrated in FIG. 2. For example, a probability distribution, a mean, and a variance related to a travel time along a street segment can be assigned to the edge associated with that street segment. For example, a travel time along street segment S5 can be defined in terms of a Gaussian probability distribution, a mean of 5 minutes, and a variance of 1 minute-squared, and those parameters can be assigned to edge E5. As discussed above, the travel time along a street segment vary with, for example, time of the year, time of the day, day of the week, etc., and multiple travel times can be associated with a single street segment. For example, one travel time along street segment S11 can be defined in terms of a Gaussian probability distribution, a mean of 6 minutes, and a variance of 2 minutes-squared, and another travel time (e.g., on a different day of the week) along street segment S11 can be defined in terms of a Gaussian probability distribution, a mean of 12 minutes, and a variance of 5 minutes-squared. Thus, multiple sets of parameters (e.g., probability distribution, mean, and variance) can be assigned to an edge.

In some embodiments, the sets of parameters assigned to an edge of the graph illustrated in FIG. 2 can be referenced (or indexed) by a day of the year, time of the day, day of the week, etc. For example, an edge can include a set of parameters for each hour of each day of the week. Thus, that edge would be assigned 168 sets of parameters. A set of parameters can be related to a group of times and/or days. For example, for each weekday, an edge can be assigned a set (or group) of parameters for each hour between 7:00 AM and 10:00 AM (e.g., rush-hour for a city), a set of parameters for the hours from 10:00 AM to 4:00 PM, a set of parameters for each hour between 4:00 PM and 7:00 PM (e.g., another rush-hour for a city), and a set of parameters for the hours from 7:00 PM to 7:00 AM. For the weekends, the edge can be assigned a set of parameters for Saturday, and another set of parameters for Sunday. Similarly, an edge can be assigned set of parameters related to, for example, other times, days, events, and/or seasons. For example, an edge related to a street segment in a shopping district can have one set of parameters for weekends in the summer months, and another set of parameters for weekends during a holiday shopping season.

The parameters assigned to each edge in the graph illustrated in FIG. 2 can be referred to as costs or weights. In other words, each edge can have an associated cost such as, for example, the mean time to traverse that street segment and/or a variance related to that mean time. In some embodiments, parameters similar to those discussed above can be assigned to the vertices of a graph. For example, a vertex can be related to an intersection and a mean and a variance related to that intersection (e.g., an mean and variance related to waiting for a stop light at the intersection) can be assigned to that vertex. Parameters or sets of parameters can include other information such as the length of a street segment related to an edge, maximum or minimum legal speed along a street segment, and/or other information.

A path (or route) between Origin and Destination can be defined by a number of edges and/or vertices. For example, a path from Origin to Destination can be defined as edge E4, edge E6, and edge E9. The graph illustrated in FIG. 2 and the parameters assigned (or related) to the edges and/or vertices of the graph can be used to determine a best (or optimal) path among a group of paths between Origin and Destination. For example, Dijkstra's algorithm or an A* (or A-star) search can be used to determine a best path from Origin to Destination. In other embodiments, other graph algorithms, searches, and/or traversal methods can be used to determine a best path from Origin to Destination. In some embodiments, a best path can be a shortest path in terms of length. In some embodiments, a best path can be a shortest path in terms of mean travel time. In some embodiments, a best path can be a path with a minimal or least amount of variance. In some embodiments, a best path is a path that has a best or highest probability of arrival before a deadline (e.g., some combination of a probability distribution, a mean, and a variance assigned to each edge along the path provides a highest probability of traveling from Origin to Destination within a deadline).

Figure 3:
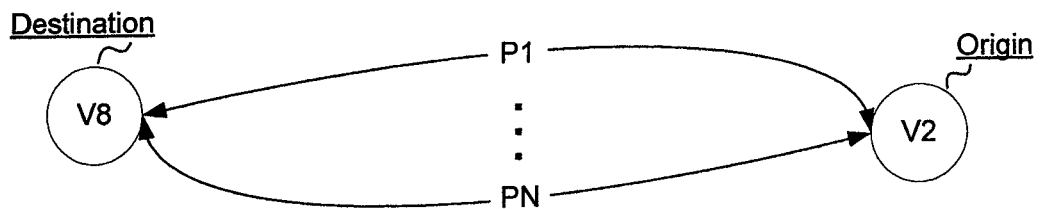
FIG. 3 is another illustration of a graph representing the portion of the traffic system of FIG. 1, according to an embodiment.

FIG. 3 is another illustration of a graph representing the portion of the traffic system of FIG. 1, according to an embodiment. As illustrated in FIG. 3, the graph illustrated in FIG. 2 can be converted from a graph of edges and vertices to a graph including Origin, Destination, and all (or a subset of all) of the paths between Origin and Destination. For example, path P1 can be defined by edges E1, E3, E6, E7, E10, and E12, and path PN can be defined by edges E2, E5, E10, and E12. Other paths (not illustrated) can be defined by other combinations of the edges of the graph illustrated in FIG. 2.

In some embodiments, parameters are assigned to paths in a similar manner as to edges. For example, a path can be assigned parameters that are the sums (or some other combination) of the parameters of the edges defining the path. Thus, the graph illustrated in FIG. 3 can be used to determine a path such as, for example, a best (or optimal) path between Origin and Destination.

Figure 4:
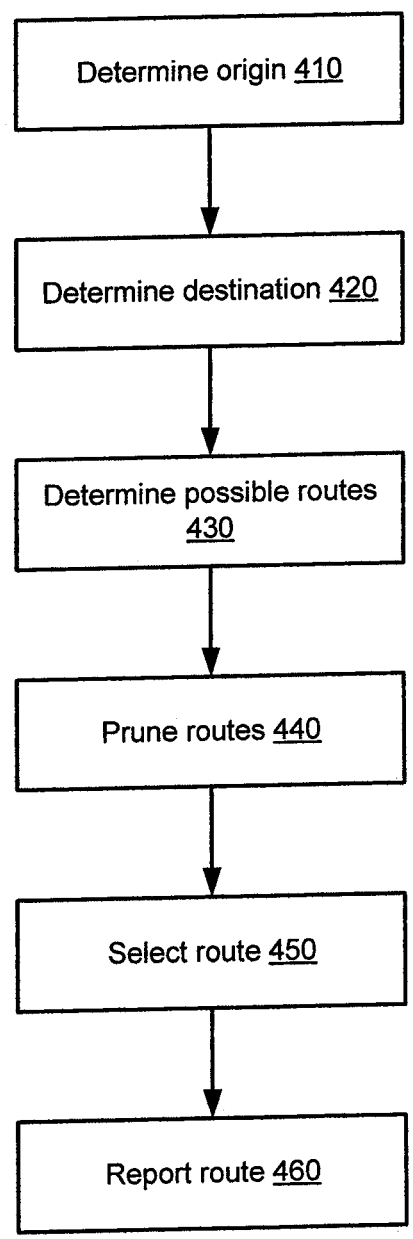
FIG. 4 is a block diagram of a process for defining a route, according to an embodiment.

FIG. 4 is a block diagram of process 400 for defining a route, according to an embodiment. As illustrated in FIG. 4, an origin is selected, at 410. For example, an origin can be selected based on GPS coordinates (e.g., latitude and longitude) determined or provided by a GPS device such as a car or portable navigation device. In some embodiments, an origin can be selected based on an address. In some embodiments, a geocoding service, application, table, and/or program can be used to determine an origin in latitudinal and longitudinal coordinates. In some embodiments, an origin can be selected from a list of known places or locations.

A destination is selected, at 420. Similar to selecting an origin, at 410, a destination can be selected using various methods. For example a destination can be selected based on an address. In some embodiments, a geocoding service, application, table, and/or program can be used to determine a destination in latitudinal and longitudinal coordinates. In some embodiments, a destination can be selected from a list of known places or locations. In some embodiments, a destination can be determined based on a signal or information provided by a remote GPS device. For example, GPS coordinates can be received from a GPS-enabled cellular phone at the destination.

Possible routes between the origin and the destination can be determined, at 430. For example, a traffic system can be modeled as a graph (as discussed above) and origin and destination points in the graph can be designated or defined within the graph based on the origin determined, at 410, and the destination determined, at 420. The graph modeling (or representing) the traffic system can then be used to determine routes between the origin and the destination. For example, a graph can be traversed to exhaustively determine all routes between the origin and the destination. In some embodiments, parameters associated with each edge (e.g., edges related to street segments) can be combined to determine the costs of traversing a path as the graph is traversed to determine the possible routes. After the possible routes between the origin and the destination are determined (and, in some embodiments, costs calculated), at 430, the list of routes can be pruned, at 440. For example, routes that are equivalent to other routes and/or routes that are clearly not best routes can be pruned or removed from the list of routes. Pruning routes can be advantageous to reduce the number of routes than are searched or analyzed to determine a best route between the origin and the destination. For example, the algorithmic complexity of determining a best route can be exponential to the number of nodes in the graph since the number of routes that are searched to determine the best path is exponential to the number of nodes. A reduction in the number of routes to search can, thus, lead to a significant reduction in the time to determine a best route.

The possible routes are then searched to select or determine the best route, at 450. For example, Dijkstra's algorithm or an A* (or A-star) search can be used one or more times to determine a best route from an origin to a destination. In other embodiments, other graph algorithms, searches, and/or traversal methods can be used to determine a best route from an origin to a destination. In some embodiments, a best route can be a shortest route in terms of length. In some embodiments, a best route can be a shortest route in terms of mean travel time. In some embodiments, a best route can be a route with a minimal or least amount of variance. In some embodiments, a best route is a route that has a best or highest probability of arrival before a deadline (e.g., some combination of a probability distribution, a mean, and a variance assigned to each edge along the route provides a highest probability of traveling from an origin to a destination within a deadline).

After the optimal route has been selected, at 450, the optimal route can be reported or presented, at 460. For example, if process 400 is implemented or executed at a portable GPS device, the optimal route can be displayed, for example, on a monitor or display of the GPS device overlaid on a map of a traffic system. Process 400 can be implemented on a computer server accessible to a computer client (e.g., a computer running a web browser) via the Internet, and the optimal route can be provided from the computer server to the computer client as an image of a map of a traffic system with the optimal route overlaid within a web page viewable at the computer client. The optimal route can be provided or reported as a textual or auditory list of street segments, intersections, and/or turns.

In some embodiments, process 400 can include more or fewer steps than illustrated in FIG. 4. Additionally, in some embodiments, steps of process 400 can be rearranged. For example, in some embodiments, process 400 does not include a pruning step. Rather, each possible route is analyzed to determine whether than route is an optimal route. In some embodiments, process 400 includes receiving a request to determine the optimal path. For example, process 400 can be implemented at a computer server configured to receive requests from computer clients for optimal routes. The computer server can receive a request for an optimal route between an origin and a destination included in the request. In some embodiments, the origin and the destination can be described (or defined) as addresses such as street addresses. In some embodiments, the origin and destination can be defined in terms of GPS coordinates. In some embodiments, one of the origin or the destination is defined in terms of GPS coordinates and the other is defined as an address. In other embodiments, the origin and/or the destination can be defined in other ways. In some embodiments, the origin and/or the destination is received (e.g., provided by a computer client to a computer server), and is not determined as part of process 400.

Selecting a best (or optimal) path between a source and a destination can include multiple sub-steps. In some embodiments, selecting a best path between a source and a destination can be a process. For example, selecting a best path between a source and a destination can be an iterative process in which paths are divided into sets of paths and are analyzed to determine a current best path. Sets of paths that do not (or cannot) include a path that is better than the current best path are discarded, and the paths in the remaining sets of paths that do (or might) have a path better than the current best path are analyzed to determine a new current best path. This process can be repeated until the best path is determined or selected.

As discussed above, in some embodiments, process 400 can be applicable in other contexts. For example, a path can include multiple hops in a packet switching network and each hop can be assigned a probability (e.g., mean, variance, probability distribution, etc.). Airline network is another example. Moreover, the method can be used for cases where a travel time of a link represents an arbitrary resource. In some embodiments, choosing a policy in stock markets that maximizes the probability of having at most an allowed total cost when each link stands for the uncertain cost of each action.

Figure 5:
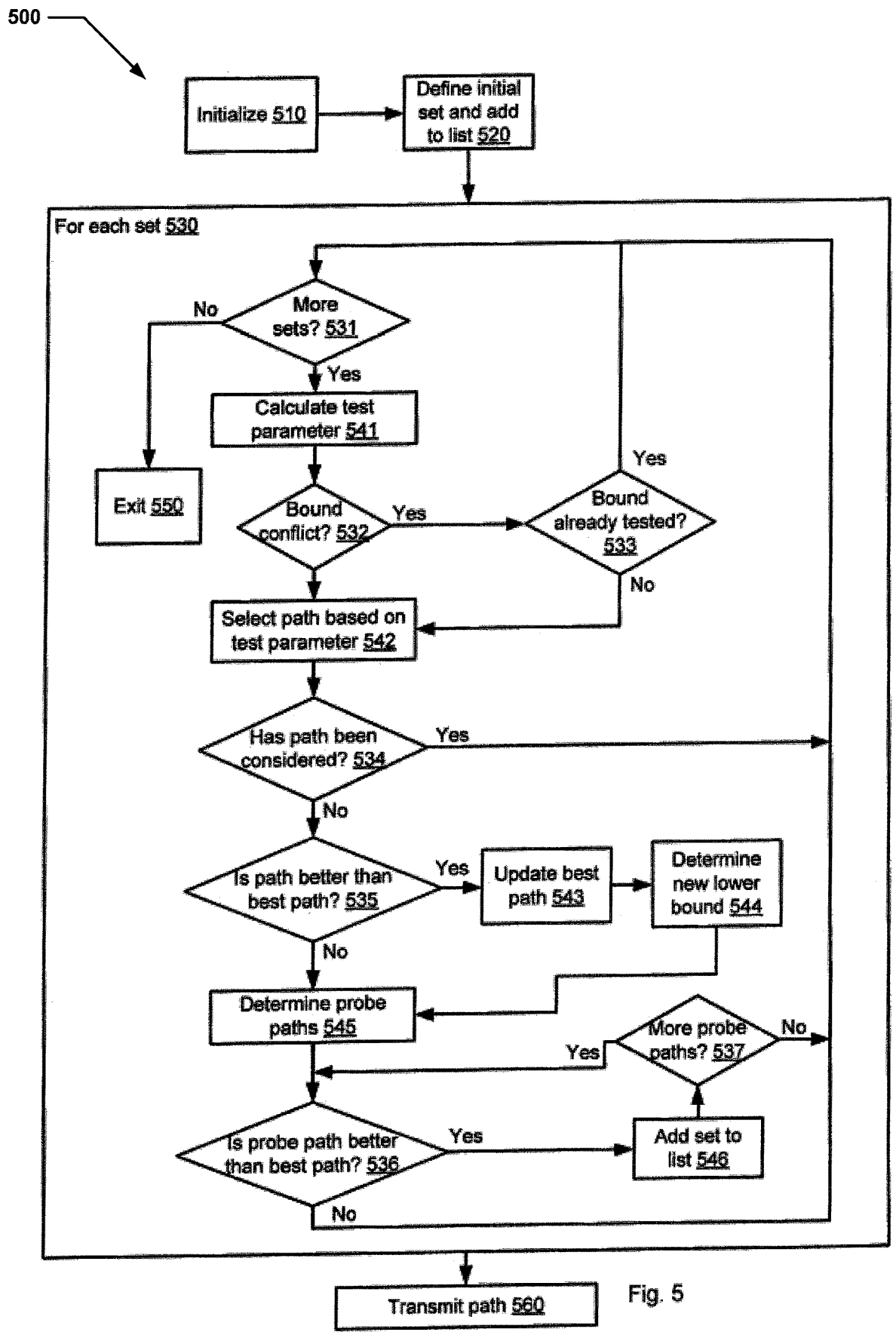
FIG. 5 is a block diagram of a process for selecting a path, according to an embodiment.

FIG. 5 is a block diagram of process 500 for selecting a path, according to an embodiment. As illustrated in FIG. 5, process 500 is initialized, at 510. For example, process 500 can be implemented or executed as a software module at a processor, and process variables can be initialized. For example, a variable representing the best path can be initialized to a value related to an undefined path (e.g., because the best path has not yet been determined). In some embodiments, step 510 can include determining boundary conditions (or bounds) such as, for example, the best and/or worst mean travel time of a path from a group of paths, a best and/or worst variance in travel time of a path from a group of paths, and/or a deadline. In some embodiments, paths having a mean greater than the deadline (or within a range about the deadline) can be removed (or pruned) from the group as unacceptable (e.g., because such paths cannot result in an arrival time before the deadline).

An initial set of paths can be defined and added to a list of sets of paths, at 520. For example, all paths in the group that satisfy the boundary conditions can be included in the initial set, and the initial set of paths can be added to a list of sets of paths including paths to be analyzed. As illustrated in FIG. 5, step 530 is repeated for each set of paths in the list. Sets of paths can be removed from and added to the list of sets of paths (also referred to as "sets" for simplicity of description), at 530. Thus, process 500 can be iterative, and continue until a best path is determined.

The list of sets (also referred to as "list" for simplicity of description) is checked, at 531, to determine whether more sets exist in the list. If there are no sets in the list, at 531, process 500 exits step 530, at 550. After process 500 exits step 530, at 550, the best path is reported, at 560. If process 500 exits step 530 before a best path has been determined, an error or other indication that a best path was not found can be reported, at 560.

If the list includes one or more sets, at 531, a set is selected from the list. For example, the list can be a stack or a queue, and a set can be removed (popped) from the stack or queue. In some, embodiments, the set is not removed from the list, but a copy is made for temporary use and the set can be removed or deleted from the list at a later time. After a set is selected from the list, one or more test parameters can be determined, at 541. For example, the best path can be determined based on some traversal of a graph from which the paths in the set are derived or determined. The traversal of the graph can determine the best path by comparing various parameters of the paths. For example, variance and mean of the paths can be combined with the test parameter as part of the traversal (or search) to determine which path is the best path.

A simple combination of mean and variance of the paths can be useful to determine the best path in the context of shortest path or fastest arrival, but other definitions of "best path" can be more applicable when a deadline is included as a boundary condition of a best path. For example, the bounds can include a deadline imposing a limit on the mean of a path that can be a best path. In other words, a bound can be an arrival deadline and a path that has a mean greater than the deadline cannot be a best path. Thus, a path with a short mean and a relatively large variance can be the best path, but might not be selected as the best path if the criterion for best path is shortest mean and lowest variance (or some combination of the mean and the variance of the path). Thus, the variance and/or mean (or some other parameter of a path)

can be modified by test parameters to determine the best path. For example, the variance of a path can be reduced by a test parameter (e.g., multiplying the variance parameter of a path by a test parameter having a value less than one to reduce the effect of the variance on the determination of the best path). In other words, the determination of a best path can be made to depend more on the mean (or some other parameter of the path) than on the variance. Descriptively, the best path can be, for example, the path that has neither the smallest mean nor the lowest variance, but provides an acceptable mean and probability of arriving before the deadline (based on, for example, a mean, a variance, and/or a probability distribution of the path). In other words, in some embodiments, the best path can be the path having the lowest mean of the set of paths that provides the highest probability of arriving before the deadline.

Bounds initialized, at 510, can impose limits on the test parameters. For example, a boundary condition on the path having the smallest mean can become a limit on the amount a variance parameter of a path can be modified to determine a better path than the path having the smallest mean. In other words, if the path that has the smallest mean has some probability of meeting the deadline (e.g., arriving at the destination before the deadline), that path is the best path unless some other path has a better or higher probability of meeting the deadline. Thus, the variance of paths should not be altered (e.g., by multiplication by a test parameter) by so much as to select as the best path a path with a larger mean and no better probability of meeting the deadline than a path with a smallest mean.

After the test parameter is selected, at 541, the test parameter is tested, at 532, to determine whether the test parameter conflicts with a bound (or boundary condition). For example, there can be a conflict with a bound if the test parameter is equal to or exceeds a bound value. If the test parameter exceeds a bound value, the test parameter can first be set to the bound value because test parameters beyond the bound conditions are not valid. At 533, it can be determined whether a test parameter having the bound value has already been tested or analyzed. If the bound value has already been analyzed, process 500 can return to step 531 to analyze additional sets. If the bound value has not been analyzed as a test parameter, process 500 continues to step 542. Similarly, if there is no conflict with a bound value, at 532, process 500 continues to step 542.

A best path (or initial best path if the first iteration through step 530) of the set selected, at 531, is selected, at 542. For example, a parameter such as the variance of each path in the set selected, at 531, can be modified by the test parameter calculated, at 541, and the best path can be selected based on a graph traversal or search such as, for example, Dijkstra's algorithm or an A* search applied to the graph including the paths in the set selected, at 531. If the path selected, at 542, has been considered (e.g., the path has been selected before as a best path of a set or current best path), at 534, process 500 can continue to step 531 to select another set. Process 500 can move on to the next set because if the path selected at 542 has been previously considered, the current best path is either that path, or some other path is better than that path. In either case, consideration of that path (or any path) need not be repeated.

If the path selected, at 542, (that is, the best path in the set selected, at 531) has not been previously considered, that path is tested or analyzed, at 535, to determine whether that path is better than the current best path. In some embodiments, a current best path can be referred to as a candidate best path, for example, because a current best path can be a candidate to be the best path between an origin and a destination. In the initial iteration of step 530, the path selected at 542 is better than the current best path because the current best path is set to a value representing an undefined value, at 510. A combination of the mean and variance of each of the current best path and the path selected, at 542, can be compared to determine which path is the better path. If the path selected, at 542, is a better path than the current best path, the current best path can be updated (e.g., set equal to) the path selected, at 542. In some embodiments, one or more boundary conditions can depend on (or be defined based on) the current best path. Thus, boundary conditions can be dependent on the current best path (or parameters thereof) and/or be updated, at 544. After updating the current best path, at 543, and/or boundary conditions, at 544, process 500 can continue to step 545. Similarly, if the current best path is better than the path selected, at 542, process 500 can continue to step 544, but without updating or changing the current best path.

Probe points (or paths) can be determined, at 545, to divide the set selected, at 531, into two or more subsets. For example, paths of the set selected, at 531, can be grouped into new sets based on mean, variance, other parameters, and/or some combination of parameters. A probe point can be defined as the best possible combination of mean, variance, and/or other parameters that are relevant to the determination of the best path. In some embodiments, paths can be grouped into sets based on ranges of mean, variance, and/or other parameters. For example, paths having a mean and variance within one range of mean values and one range of variance values can become (be grouped into) one set, and paths having a mean and variance within another range of mean values and another range of variance values can become another set. A probe point can be the best path in the new set. For example, each new set can be tested or analyzed for the best path in that set based on the criteria to determine whether one path is better than another path (e.g., step 535), and the best path for each set can be a probe point for that set. In some embodiments, a probe point can be a theoretical best path in the new set. For example, a theoretical path can be determined for each new set to have certain properties (e.g., the lowest mean in a range of mean values and the lowest variance in a range of variance values) such that the theoretical path is the best possible path for that set.

If a probe path (or point) is better than the current best path, at 536, the set related to that probe path is added to the list, at 546. In other words, if the probe path is better than the current best path, the set related to that probe path may include paths that are better than the current best path. The set that is added to the list, at 546, will be analyzed (or considered) in a subsequent iteration of step 530. As illustrated in FIG. 5, if additional probe paths were determined, at 537, process 500 can continue to determine whether another probe path is better than the current best path, at 536. If the current best path is better than the probe path, at 536, process 500 can continue to step 531 to consider other sets. In other words, because the current best path is better than the probe path and the probe path represents the best possible path of the set, the set does not include a path that is better than the current best path. Because the set related to that probe path was not added to the list, the paths included in that set will not be analyzed by process 500. Thus, the number of paths that are analyzed in subsequent iterations of step 530 is reduced.

In some embodiments, process 500 can include more or fewer steps than illustrated in FIG. 5. In some embodiments, process 500 can use either one of the probing and bounding method. Additionally, in some embodiments, steps of process 500 can be rearranged. For example, in some embodiments, process 500 does not test or check to determine whether a path has previously been considered or analyzed. In some embodiments, probe path can be determined or calculated as theoretical paths, and paths from a set can be grouped into new sets after it is determined whether a new probe path (related to a potential set of paths) is better than that probe path.

Processes similar to process 500 can be stochastic shortest-path algorithms that can be used for traffic information systems. For example, a graph can represent a road network (also referred to as a geographic map), in which nodes (or vertices) represent intersections and edges represent street segments. A mean travel time or delay and a variance can be associated with each edge (or street segment) and/or node (or intersection) based on, for example, historical observation and/or real time traffic statistics. This per-intersection granularity geographic map can result to a large graph for small road segments with related travel statistics. In some embodiments, statistically related street segments are combined into groups such that delay characteristics are preserved without losing information about alternate path segments. Statistically related street segments can be, for example, street segments that have similar or identical statistical or probabilistic parameters. The grouping process can comprise determining some road segments as group candidates and assigning a portion of group candidates into a group. In some embodiments, the group candidates can be determined by the number of samples of traffic data, and a group can be defined by a list of multiple consecutive road segments that are bounded by junctions of group candidates. In some embodiments, the graph with associated delay information can be referred to as a delay statistics map. The geographic map can be used for matching GPS traces onto street segments, and the delay statistics map can be used for statistical delay sensitive routing. That is, the delay statistics map can be used to determine a best or optimal route given a deadline. In some embodiments, the delay of each edge follows a Gaussian probability distribution. In some embodiments, the delay of each edge is independent of every other edge. Said differently, it can be assumed that a delay of one edge of the delay statistics map does not affect delays of other edges in the delay statistics map. In some embodiments, the correlation of the travel time between segments can be represented by virtual edges.

In some embodiments, restricted maneuvers can be considered so that the route does not violate any restriction. An efficient method of ensuring that the route complies with various allowed maneuvers and turn possibilities is needed. In some embodiments restricted maneuver can be described by a sequence of nodes or by a sequence of edges that is not allowed to be driven. In some embodiments, the sequences can be stored in a database. In some embodiments, the sequences can be stored in a data structure that resides in computer memory.

Selecting a best or optimal path based on the delay statistics map can be referred to as stochastic motion planning, and can be implemented (as discussed above) as a graph search problem over a graph with an origin and a destination. In some embodiments, the travel time of each edge (or the edge delay) can be an independent Gaussian random variable. Said differently, the travel time $t_\pi$ for a path $\pi$ (having mean $m_\pi$ and variance $v_\pi$) consisting of edges e of mean $m_e$ and variance $v_e$ can be defined as:

$$t_\pi \sim \mathcal{N}(m_\pi, v_\pi), \text{ where}$$
$$m_\pi = \sum_{e \in \pi} m_e \text{ and } v_\pi = \sum_{e \in \pi} v_e.$$

The objective or goal of stochastic motion planning can be to minimize an expected cost when a cost function modules the goal of some user. For example, a linear cost can increase linearly with travel time. That is, for each increment in time as a user travels from origin to destination, the cost increases. If the cost of arriving at the destination in time t is $C(t)=t$ and the delay probability density function ("PDF") of a path $\pi$ is $f_\pi(t)$, the expected cost ("EC") of traveling through path $\pi$ is:

$$EC_\pi = \int_{-\infty}^{\infty} t f_\pi(t) \, dt.$$

Linear cost models the path with minimum expected time. In other words, the optimal or best path is the path that has minimal expected time. Exponential cost models a cost function that increases sharply (e.g., exponentially or geometrically) as the travel time increases. When the cost function is $C(t)=e^{kt}$, where k is the steepness of the cost increase, the expected cost can be written as:

$$EC_\pi = \int_{-\infty}^{\infty} e^{kt} f_\pi(t) \, dt = \left\{ e^{k\left(m_\pi + \frac{k v_\pi}{2}\right)} \right\}.$$

This exponential cost function minimizes a linear combination of mean and variance determined by k.

Linear and exponential cost functions are generally continuous and do not express a deadline. Furthermore, minimum expected cost path for linear cost and exponential costs can be found by a deterministic shortest-path algorithm, such as Dijkstra's or A* search algorithm because the cost of a path can be expressed as the sum of the cost of each edge in the path. Step cost, however, models a cost that only penalizes the late arrival after a given deadline. The cost function is $C(t, d)=u(t-d)$, where the function u is the unit step function and d is the deadline. For step cost, the expected cost is:

$$EC_\pi = \int_{-\infty}^{\infty} u(t-d) f_\pi(t) \, dt = \int_u^{\infty} f_\pi(t) \, dt = \left\{ 1 - \Phi\left(\frac{d - m_\pi}{\sqrt{v_\pi}}\right) \right\},$$

where the function $\Phi$ is the cumulative distribution function of the standard normal distribution. Thus, when a set of all paths ($\Pi$) from origin to destination is considered or analyzed, the minimum expected cost path is:

$$\operatorname{argmax} \pi \in \Pi \, \Phi\left(\frac{d - m_\pi}{\sqrt{v_\pi}}\right)$$

which is the path that maximizes the probability of arriving before the deadline. Because the function $\Phi$ is monotonically increasing, maximizing the function $\Phi$ is equivalent to maximizing:

$$\varphi_d(\pi) = \left(\frac{d - m_\pi}{\sqrt{v_\pi}}\right).$$

This equation can be referred to as a cost function. Because step costs are nonlinear, deterministic shortest-path algorithm, such as Dijkstra's and A* search algorithm cannot be used. Thus, other methods must be used to determine the path that maximizes the probability of arriving before a given deadline. This path can be referred to as the best or optimal path.

The cost function above can be rewritten in a parametric form as a function of $m_\pi$ as follows to show the relation between $v_\pi$ and $m_\pi$:

$$v_\pi = \frac{1}{\varphi_d(\pi)}(d - m_\pi)^2,$$

which is a parabola in the m-v plane with apex at d, where $\varphi_d(\pi)$ is determined by the curvature of the parabola. Thus, the optimal path (as discussed above) is the path that lies on the parabola of smallest curvature within the m-v plane. The optimization problem is to find the first path that intersects the parabola as the parabola is lifted up starting from the horizontal (m) axis. The optimal path can be determined based on linear optimization with various combinations of cost coefficients (e.g., mean and variance for each path or $m_\pi$ and $v_\pi$). This process can be referred to as parametric optimization.

In other words, the best path can be determined by plotting the possible paths on a two-dimensional graph and determining which path is first intersected by a parabola as the curvature of that parabola increases. That is, the best path can be determined graphically. In some embodiments, the best path can be determined using various linear combinations of cost coefficients or parameters such as mean path travel times and variances. For example, the optimal path can be determined by setting the cost of each edge in a path to be linear combinations of edge mean and edge variance, $m_e + \lambda^* v_e$, for an arbitrary non-negative $\lambda$. This solution for this edge cost can be referred to as a $\lambda$-optimal solution (or $\lambda$-optimal path). This edge cost models a path cost as a continuous linear combination. Thus, a best path can be determined based on a deterministic shortest-path algorithm, such as Dijkstra's and A* search algorithm.

In some embodiments, a solution (or best path) to stochastic motion planning is determined by exhaustively enumerating an analyzing all the extreme points of the paths along a convex hull of a parabola in the m-v plane as the curvature of the parabola is increased. For example, a best path can be determined as follows. First, the $\lambda$-optimal paths for $\lambda=0$ (the path with the smallest mean) and $\lambda=\infty$ (the path with the smallest variance) are determined. If these $\lambda$-optimal paths are the same, that path is the optimal solution. Otherwise, the $\lambda$-optimal path is determined using:

$$\lambda = -\frac{m_0 - m_\infty}{v_0 - v_\infty},$$

where $m_0$ is the mean of the $\lambda=0$ path, $m_\infty$ is the mean of the $\lambda=\infty$ path, $v_0$ is the variance of the $\lambda=0$ path, and $v_\infty$ is the variance of the $\lambda=\infty$ path. This $\lambda$ value will result in a search of all the possible paths. If no new path is found, the optimal solution or path is the one with the largest $\varphi_d(\pi)$ value. Otherwise, the newly found path (or parameters such as mean and variance) can be used to divide the search region into two parts. Then, the $\lambda$-optimal search is executed for each region using $\lambda$ values determined to search each region completely. In other words, analyzing each path in each region (or set). In this approach, when the number of extreme points is $N_e$, there will be $N_e$ searches to guarantee that all the extreme points are enumerated. In addition, $N_e - 1$ more searches are needed to conclude that no other paths exist between the extreme points. Thus, the total number of enumerations could be large. In some embodiments, the number of $\lambda$-optimal searches can be decreased by not searching sets or regions of paths that do not or cannot include a best path.

Figure 6A:
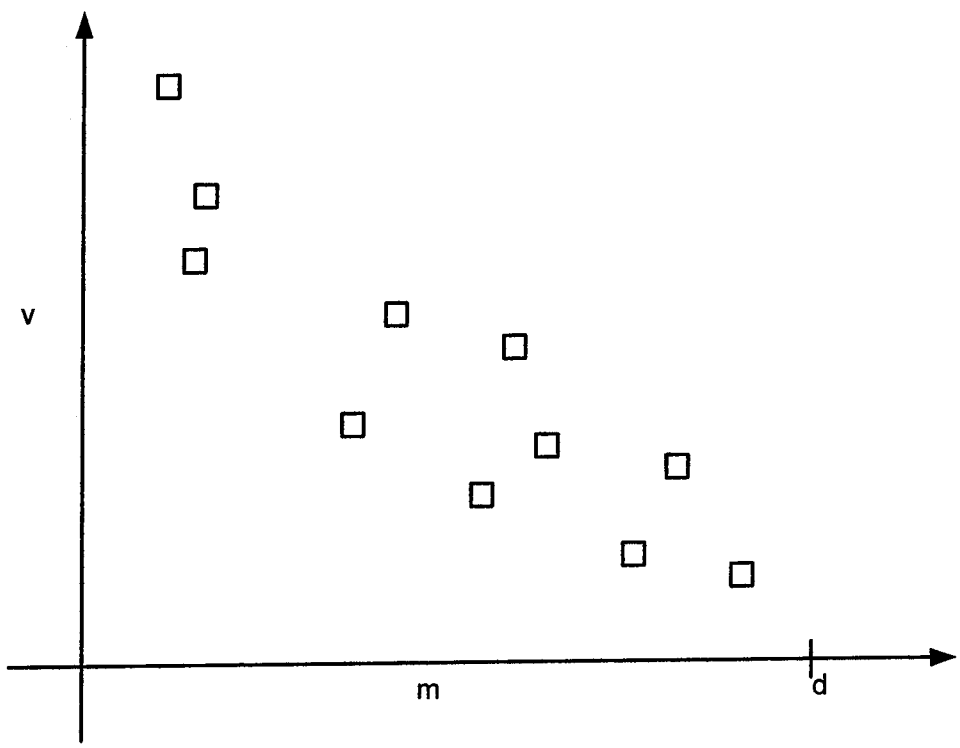
FIGS. 6A-6F are a graphical representation of a process for selecting a path, according to an embodiment.
Figure 6B:
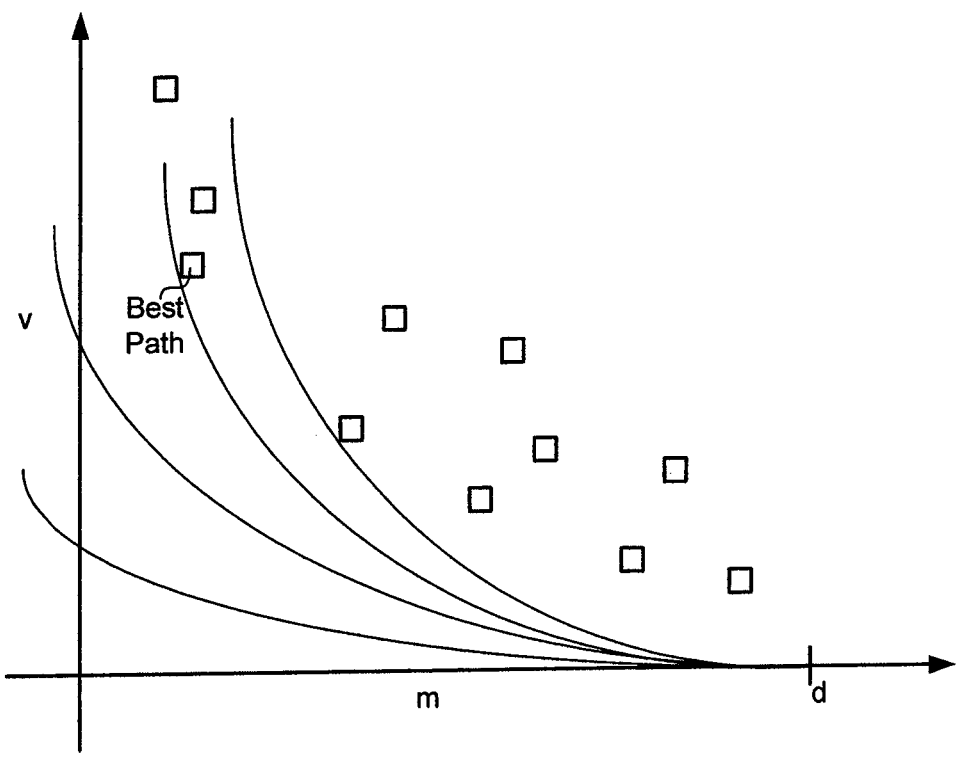

FIGS. 6A-6F are a graphical representation of a process for selecting a path, according to an embodiment. As illustrated in FIG. 6A, a number of potential paths from an origin to a destination are plotted (as squares) in an m-v (mean-variance) plane. Also illustrated in FIG. 6A is a deadline d plotted on the m-axis. In other words, the deadline d is plotted on the m-axis to indicate a limit on the travel time that is acceptable for a best path. FIG. 6B illustrates a parabola extending from the deadline d, and increasing in curvature to determine the optimal path from the path plotted in the m-v plane. As illustrated in FIG. 6B, the best path is the first path intersected by the parabola as the curvature of the parabola increases.

Figure 6C:
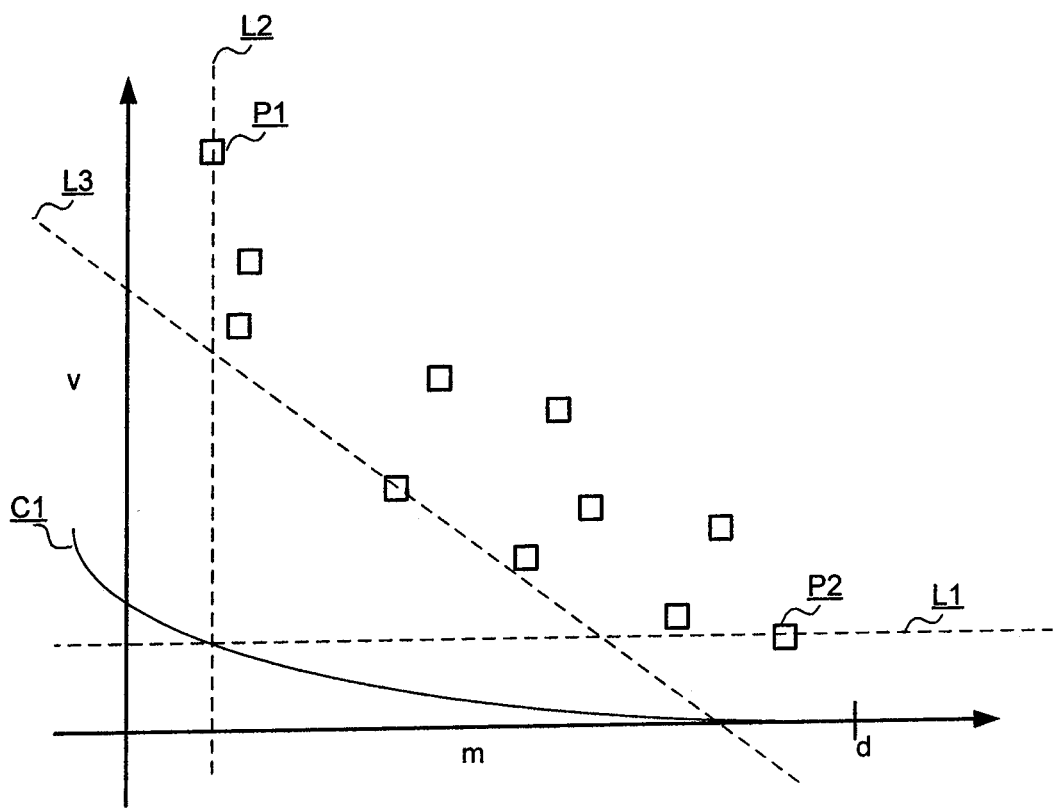

FIGS. 6C-6F graphically illustrate a selection of the best path shown in FIG. 6B. The $\lambda=0$ path and $\lambda=\infty$ path are identified as path P1 and path P2, respectively. These paths can be identified based on smallest mean and variance. Line L1 can be referred to as a boundary condition of the smallest or lowest variance of possible best paths. In some embodiments, L1 can be referred to as the $\lambda=\infty$ line. Similarly, line L2 can be referred to as a boundary condition of the smallest or lowest mean of possible best paths. In some embodiments, L2 can be referred to as the $\lambda=0$ line. The intersection of lines L1 and L2 define a starting point for the parabola that is used to determine the best path. As illustrated in FIG. 6C the initial position of the parabola is illustrated as parabola C1. This parabola can be referred to as the current $\lambda$-optimal parabola. A first $\lambda$ value can be defined as:

$$\lambda = -\frac{m_0 - m_\infty}{v_0 - v_\infty},$$

and the paths illustrated as squares in FIG. 6C can be modified by this $\lambda$ value (or test parameter). As discussed above, the paths can be expressed as linear combinations of edge mean and edge variance of the edges constituting each path, such as $m_e + \lambda^* v_e$. The modified paths can be analyzed (using, for example, Dijkstra's or an A* search algorithm) to determine the best path for on this $\lambda$ value. This is equivalent to defining a line having a slope of the parabola C1 crossing through the point in the m-v plane at which lines L1 and L2 intersect and sliding that line to left of the graph illustrated in FIG. 6C until intersecting a path. The path first intersected by the line, or selected as the best path for the current $\lambda$ value, can be referred to as the current best path and is labeled P3 in FIG. 6D.

Figure 6D:
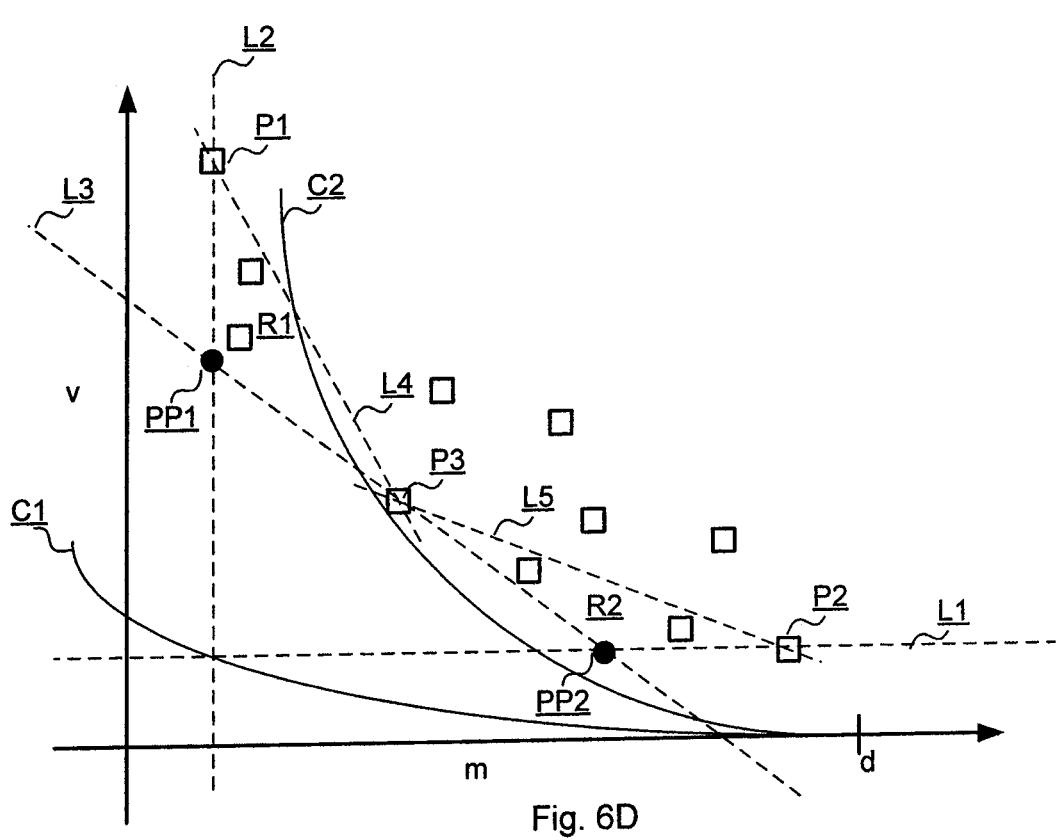

As illustrated in FIG. 6D, the parabola illustrated by C2 (i.e., the current $\lambda$-optimal parabola) intersects path P3, but this is not the first path intersected by the parabola as the parabola's curvature increases, thus graphically it appears that path P3 is not the best path. Whether path P3 is the best path can be determined by defining regions R1 and R3 by defining line L4 from P3 to P1, and line L5 from P3 to P2. Also, probe points (or probe paths) PP1 and PP2 are defined at the intersections of L2 and L3, and L1 and L3, respectively. Thus, as illustrated in FIG. 6D, region R1 is defined by line segments joining P1, PP1, and P3, and region R2 is defined by line segments joining P2, PP2, and P3. Probe paths PP1 and PP2 are extrema (or extreme points) for regions R1 and R2, respectively, along the parabola that can be used to determine the best path from an origin to a destination. In other words, PP1 and PP2 represent the best possible path within region R1 and R2. Because, in some embodiments, probe paths are not actual paths from the origin to the destination, probe paths can be referred to as virtual or theoretical paths. Thus, if a probe path is not a better path than the current best path, no path within the region of the related to that probe path is better than the current path. Accordingly, such a region and the paths within that region can be ignored (or discarded) and fewer paths are searched to select or determine a best path. This can result in a more efficient determination of a best path.

Figure 6E:
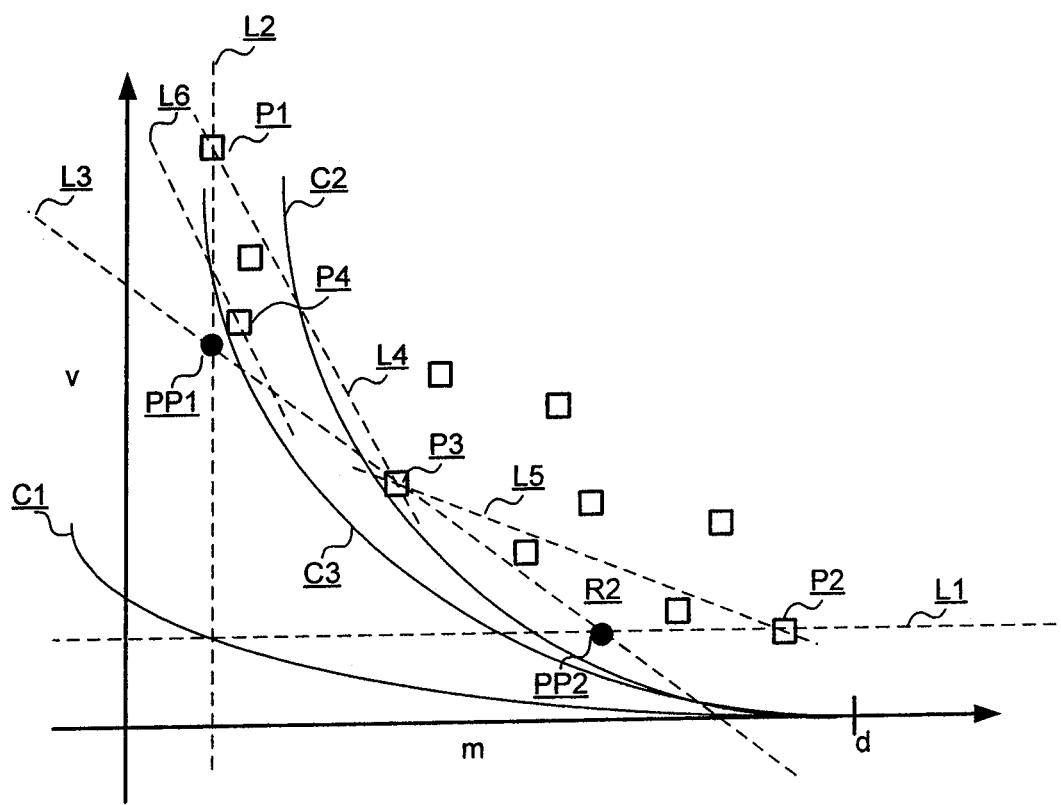

For the probe paths PP1 and PP2 illustrated in FIG. 6E, probe path PP1 is a better path than P3 and probe path PP2 is not a better path than path P3. Graphically, this can be determined based on the parabola illustrated (at with various curvatures) in FIG. 6E as C1, C3, and C2, in order of increasing curvature. Because that parabola intersects PP1 before P3 as the curvature is increased, PP1 is a better path than P3 and the paths within region R1 can be analyzed to determine whether a path within R1 is a better path than P3. Similarly, the parabola intersects PP2 after P3 as the curvature of the parabola curvature increases. Because PP2 is related to (or associated with) region R2 (that is, PP2 defines a vertex of R2) and PP2 is a less optimal path than P3, the paths within R2 will not be analyzed.

The paths within R1 can be analyzed in a similar manner to the first analysis of the paths illustrated in FIGS. 6A-6F. In some embodiments, λ can be updated (for example, λ can be decreased), and the paths within R1 can be expressed as linear combinations of mean and variance, $m_e + \lambda * \upsilon_e$. In some embodiments, λ can be updated to have a value equal to the negative inverse of the parabola at the point along the parabola at which the parabola intersects P3. These modified paths can be analyzed (using, for example, Dijkstra's or an A* search algorithm) to determine the best path for on this λ value. As illustrated in FIG. 6E, path P4 is determined to be the best path in region R1. As discussed above, the search of the paths modified by the current λ value is equivalent to defining a line (labeled L6 in FIG. 6E) having a slope of the parabola C2 where C2 crosses through path P3, and sliding that line to right of the graph illustrated in FIG. 6E until intersecting a path. The path intersected by the line, or selected as the best path for the current λ value can be referred to as the current best path, and is labeled P4 in FIG. 6E. The parabola C3 extends from the deadline d through the current best path P4 and can be referred to as the current λ-optimal parabola.

Figure 6F:
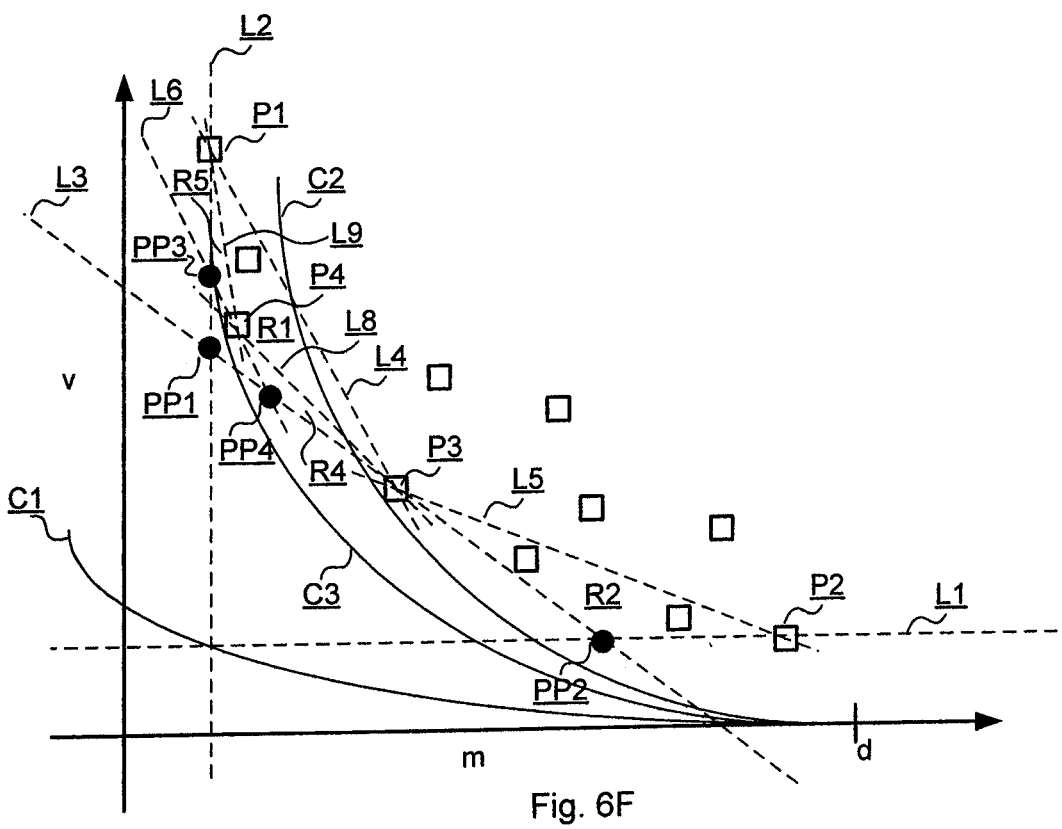

Referring now to FIG. 6F, regions R4 and R5 can be defined by defining line L8 from P4 (the current best path) to P3 (the previous best path), and line L9 from P4 (the current best path) to P1 (the λ=0 path), respectively. The probe points PP3 and PP4 are defined by the intersections of L6 (the current λ line) and L2 (the λ=0 line), and L6 and L3 (the current λ line), respectively. As illustrated in FIG. 6F, PP3 is a better path than P4 because the parabola intersects PP3 before P4 as the curvature of the parabola increases.

Conversely, PP4 is not a better path than P4 because the parabola intersects P4 before PP4 as the curvature of the parabola increases. Thus, no paths within regions R4 can be better paths than P4, and region R5 can include paths that are better than P4. However, no paths are included in R5. Thus, P4 is the best path.

Although FIGS. 6A-6F have been discussed is a graphical context (e.g., regions, triangles, lines, and points), in some embodiments, the same results can be reached algebraically. That is, geometric equations can be used to determine a best path programmatically. In other words, the equations that describe the parabola, lines, slopes, probe paths, paths and/or regions of FIGS. 6A-6F can be used to determine an optimal path. Additionally, although the best path illustrated in FIGS. 6A-6F was determined or selected after three rounds of selecting a current best path, in some embodiments a best path can be determined based on additional or fewer rounds of selecting a current best path. For example, if region R5 included a path, that path might be better than path P4. Thus, that path (and any others included in R5) could be analyzed by selecting a new λ value (for example, the negative inverse of the slope at P4 in the m-v plane of the parabola intersecting with P4) and to determine the best path for on this λ value (using, for example, Dijkstra's or an A* search algorithm).

In some embodiments, λ can be bound or limited by boundary conditions. For example, λ can have an upper limit that is the negative inverse of the slope of a parabola passing through the intersection point of the λ=0 line and λ=∞ line at the intersection point. In some embodiments, λ can have a lower bound or limit of the negative inverse of the current λ-optimal parabola at the intersection of that parabola and the λ=0 line. Thus, in some embodiments, the bounds or boundary conditions can be updated as the search for a best path progresses.

The following pseudo-code listing illustrates process 500 and the methods disclosed with respect to FIGS. 6A-6F.

```
1:   bestPath = NULL
2:   Regions = [ ]
3:   path_0 = search_ λ_optimal_path (0)
4:   path_∞ = search_ λ_optimal path (∞)
5:   if path_0 == path_∞ then
6:      return path_0
7:   Regions.push (Region (vertex_l : path_0, vertex_r : path_∞,
              probe : (path_0.mean, path_∞.variance)))
8:   calculate upper_ λ and lower_ λ
9:   while (R = Regions.pop () != NULL) do
10:     if (R.probe.φ < bestPath.φ) then continue
11:     λ = - [(R.vertex_l.mean - R.vertex_r.mean) /
            (R.vertex_l.variance - R.r.variance)]
12:     if (λ >= upper_ λ) then
13:        if (upper_ λ was not searched) then λ = upper_ λ else continue
14:     if (λ <= lower_ λ) then
15:        if (lower_ λ was not searched) then λ =lower_ λ else continue
16:     path = search_ λ_optimal_path (λ)
17:     if (path != R.vertex_l and path != R.vertex_r) then
18:        if (path.φ > bestPath.φ) then
19:           bestPath = path
20:           update lower_ λ
21:        locate probe_l
22:        locate probe_r
23:        if (probe_l.φ > bestPath.φ) then
24:           Regions.push (Region (vertex_l : R.vertex_l,
                 vertex_r : path,
                 probe : probe_l))
```

```
25:        if (probe_r.φ > bestPath.φ) then
26:           Regions.push (Region (vertex_1 : path,
              vertex_r : R.vertex_r,
                 probe : probe_r))
27:     return bestPath
```

As illustrated at line 1, bestPath is initialized to NULL or some other value that indicates no best path has yet been determined. bestPath can be a variable such as an object or a class representing a path (or route). For example, bestPath can be an object including mean, variance, and φ properties. φ can be defined (as above) as:

$$\varphi_d(\pi) = \left(\frac{d - m_\pi}{\sqrt{v_\pi}}\right),$$

and can be related to the curvature of a parabola within an m-v plane. bestPath can be initialized to a value other than NULL such as a default of invalid value.

Regions can be a container such as a first-in, first-out ("FIFO") container for regions. For example, regions can be added or pushed to and stored within Regions, and can be removed or popped from Regions to access the regions stored at Regions. Regions are initialized to be empty at line 2. Implicitly, regions include multiple paths. For example, a region can be a data structure, object, or class that can include the paths of a graph that are within a region. In some embodiments, regions can be referred to as sets to emphasize, for example, that a region includes or is related to a set of paths within a graph.

At lines 3 and 4, two initial paths are defined and initialized. path_0 is a path that is related to the λ-optimal search executed on a graph of paths for λ=0 as described above. Said differently, path_0 is the λ-optimal path for λ=0. Similarly, path_∞ is a path that is related to the λ-optimal search executed on a graph of paths for λ=∞ as described above. Said differently, path_∞ is the λ-optimal path for λ=∞. search_λ optimal_path( ) can be a function or method operable to select an optimal path from a graph using, for example, Dijkstra's algorithm or an A* (or A-star) search based on a λ value provided as an argument. In some embodiments, path_0 and path_∞ are referred to as bounds or boundary conditions. As discussed above, these paths represent the paths in a graph searched (or traversed) by search_λ optimal_path( ) with the lowest mean and variance, respectively. At line 5, path_0 is tested against path_∞ to determine is these paths are the same path. If path_0 and path_∞ are the same path, that path is the best or optimal path because this path will have the lowest mean and variance of all paths within the graph. At line 6, path_0 is reported as the best path if path_0 and path_∞ are the same path.

A region is defined and pushed to Regions, at line 7. As illustrated in line 7, the regions pushed to Regions are characterized by at least three parameters: a vertex_1 value, a vertex_r value, and a probe value. These values define the boundaries of the region (or set) and are paths. Said differently, these values define which paths from the graph are included in each region. The region defined is assigned a vertex_1 value of path_0, a vertex_r vale of path_∞, and a probe value having the mean of path_0 and the variance of path_∞. Thus, all the paths in the graph can be included in the region pushed to region, at line 7. Furthermore, the probe value represents a path (real or theoretical) that indicates whether the region can contain better route than the current optimal route or not. An upper_λ value and a lower_λ value are calculated, at line 8. For example, initially upper_λ and lower_λ can be assigned a value equal to the negative inverse of the slope of a parabola that has a vertex on the m-axis at a deadline mean value of an m-v plane and passes through a point within the m-v plane defined by the mean (m) and variance (v) of the probe of the region defined at line 7 at that point.

Lines 9-26 repeat until there are no regions in Regions, and the bestPath is reported (or returned) at line 27. At line 9, a region is popped or removed from Regions. As discussed above, the goal of the parametric optimization is to maximize φ, and at line 10 the φ value of bestPath is compared with the φ value of the probe of the region selected at line 9. If the φ value of bestPath is greater than the φ value of the probe, bestPath is better than any path in the region and those paths need not be searched or analyzed because the probe is the optimal or best possible path within a region. Said differently, the paths within the region can be discarded from the search for the optimal path if the φ value of bestPath is greater than the φ value of the probe for the current region. If the φ value of the probe is greater than the φ value of bestPath, the paths within the region are searched (using search_κ_optimal_path( ) to select the optimal path for the region using the λ value determined at line 11.

Lines 12-15 are boundary conditions or limits on possible λ values. For example, upper_λ and lower_λ are the largest and smallest values of λ for which search_λ_optimal_path ( ) will be invoked, run, or called. If λ is greater than upper_λ or less than lower_λ,λ is assigned the value of upper_λ or lower_λ, respectively. If search_λ_optimal_path( ) has already been run for the current λ value, the λ-optimal search is not repeated and the next region is removed from Regions at line 9.

At line 16, the λ-optimal search is run on the portion of the graph including the paths within the current region (i.e., the region removed from Regions at line 9), and path is assigned the value of the λ-optimal path selected by search_λ_optimal_path(λ). In other words, path is a current best or optimal path, or the optimal path that exists within the current region. path is compared with the left (vertex_1) and right (vertex_r) bounds of the current region at line 17. If path is equal to vertex_1 or vertex_r, path is not a better path than bestPath and the next region is Regions is removed from Regions at line 9.

If the φ value of path is greater than the φ value of bestPath, at line 18, then path is a better path than bestPath, and path is assigned to bestPath, at line 19. At line 20, lower_λ can be updated based on the new bestPath. In some embodiments, lower_λ is dependent on bestPath. For example, lower_λ (that is, the smallest allowed value of λ) can be a value equal to the negative inverse of the slope of a parabola that has a vertex on the m-axis at a deadline mean value of an m-v plane and passes through a point within the m-v plane defined by the mean (m) and variance (v) of the probe of the region defined at line 7 where the parabola intersects a vertical line defined by the mean of path_0.

New regions are defined and possibly pushed to Regions at lines 21-26. probe_1 (a probe point for a region left of path within the m-v plane) and probe_r (a probe point for a region right of path within the m-v plane). probe_1 and probe_r are the extrema of the regions and, thus, can be used to probe the regions to determine whether a region can include a path better than bestPath. For example, probe_1 and probe_r can be defined as described above with respect to PP1 and PP3, and PP2 and PP4 in FIGS. 6D-6F. In other embodiments, probe_1 and probe_r can be defined in other ways such that each is an extreme of the region to which it is related.

If the φ value of probe_1 is greater than the φ value of bestPath, probe_1 is used to define a region and that region is added to Regions. If the φ value of probe_1 is less than (or equal to) the φ value of bestPath, probe_1 is not used to define a region. Similarly, if the φ value of probe_r is greater than the φ value of bestPath, probe_r is used to define a region and that region is added to Regions. If the φ value of probe_r is less than (or equal to) the φ value of bestPath, probe_r is not used to define a region. On subsequent iterations of lines 9-26, only paths that are within regions pushed to Regions are searched using search_λ optimal_path( ). Thus, fewer paths are searched than a solution to stochastic motion planning in which all paths are exhaustively enumerated during analysis of a graph of paths to determine an optimal path.

Figure 7:
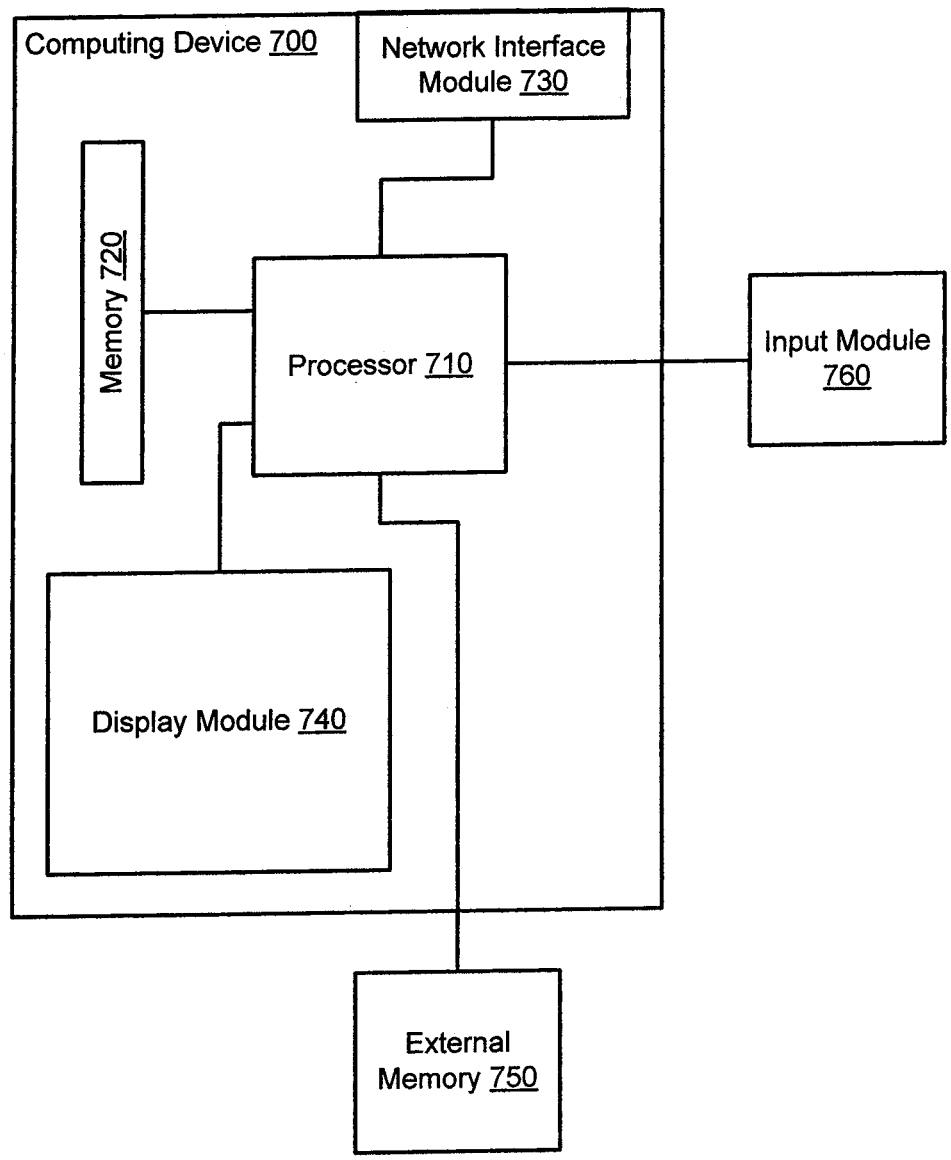
FIG. 7 is a system block diagram of a computing device, according to an embodiment.

In some embodiments, a computing device such as a GPS device, a smartphone, a computer (e.g., laptop computer or desktop computer), a personal digital assistant ("PDA"), vehicle navigation system, or other device can include a memory and a processor configured to determine a path between an origin and a destination. FIG. 7 is a system block diagram of a computing device, according to an embodiment. As illustrated in FIG. 7, computing device 700 can include processor 710, memory 720, network interface module 730, and display module 740. Processor 710 is operatively coupled to and in communication with memory 720, network interface module 730, and display module 740.

Processor 710 can be configured to implement or execute a process for defining or identifying a path between an origin and a destination from a group of paths. For example, processor 710 can execute commands stored at memory 720 to execute such a process. In some embodiments, processor 710 can be an application-specific processor configured to implement such a process. For example, an application-specific processor can include an internal memory or can include transistor configured to cause the application-specific processor to implement such a process.

A processor can be operatively coupled to a network interface such that the processor can be configured to be in communication with communications network 840 via a network interface. Furthermore, a processor can be any of a variety of processors. Such processors can be implemented, for example, as hardware modules such as embedded microprocessors, microprocessors as part of a computer system, Application-Specific Integrated Circuits ("ASICs"), and Programmable Logic Devices ("PLDs"). Some such processors can have multiple instruction executing units or cores. Such processors can also be implemented as one or more software modules in programming languages as Java™, C++, C, assembly, a hardware description language, or any other suitable programming language. A processor according to some embodiments includes media and computer code (also can be referred to as code) specially designed and constructed for the specific purpose or purposes.

A memory can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

In addition to a memory as described above, some embodiments include another memory or processor-readable (or computer-readable) medium (not shown) having instructions or computer code thereon for performing various processor-implemented operations. Examples of such processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; solid-state memory such as SSDs and FLASH memory; and ROM and RAM devices. Examples of computer code include, but are not limited to, micro-code or micro-instructions, machine instructions (such as produced by a compiler), and files containing higher-level instructions that are executed by a computer using an interpreter. For example, an embodiment may be implemented using Java™ C++, or other object-oriented programming language and development tools. Additional examples of computer code include, but are not limited to, control signals, encrypted code, and compressed code.

Information about a traffic system can be accessible to processor 710 at memory 720. For example, a graph representation of a traffic system can be accessible at memory 720. For example, a graph of nodes and edges representing intersections and street segments, respectively, can be included within memory 720. Parameters of the nodes and edges such as, for example, means, variances, probability distributions, or other probabilistic parameters can also be included in memory 720 and associated with the nodes and edges of the graph. In some embodiments, information related to a traffic system (such as a graph based on the traffic system) can be accessible at external memory 750. External memory 750 can be, for example, a memory module accessible to processor 710, but external to computing device 700. For example, external memory 750 can be an external mechanical hard drive or solid-state hard drive operatively coupled to processor 710 via a universal serial bus ("USB") connection, a secure digital ("SD") flash or compact flash memory card, or some other external memory module. In some embodiments, processor 710 can access information related to a traffic system via a communications network and network interface module 730. For example, processor 710 can access a remote database via a communications network operatively coupled to computing device 700 by network interface module 730. An internal memory of computing device 700 can receive updates to information related to a traffic system (e.g., updated paths, street segment, path or edge parameters such as mean travel times and variance) via network interface module 730.

Processor 710 can provide an interface for selecting an origin and destination via display module 740 and input module 760. For example, display module 740 can be a visual display and input module 760 can be, for example, a mouse, a trackpad, a track or point stick, or a keyboard. For example, in some embodiments, processor 710 can access a digital map stored at memory 720 can display a representation of the map at display module 740. A user of computer device 700 can select an origin and a destination from the map using, for example, a mouse. For example, the user can click on a first point of the map to select that point as the origin of the route, and the user can click on a second point of the map to select that point as the destination of the route. In some embodiments, the user can input an origin and/or destination using a keyboard or other text input device. In some embodiments, input module 760 can be a touch detection module overlaid on at least a portion of display module 740 can the user can select an origin and a destination by touching display module 740. In some embodiments, a user can enter an origin and/or a destination by entering text at a virtual keyboard overlaid at display module 740 by, for example, processor 710.

In some embodiments, a user can select an origin and/or a destination from a list of geographical points. In some embodiments, a computing device can include a GPS module (not shown) operatively coupled to processor 710, and an origin and/or destination can be selected based on current GPS coordinates, or GPS coordinates saved or storage at a memory of computing device 700. After the user has selected an origin and a destination, the user can cause computing device 700 to determine a route from the origin to the destination by, for example, pressing a button (not shown) on computing device 700, or touching a portion of display module 740. Display module 740 can be referred to as a user interface subsystem. That is, display module 740 provides an interface for a user to interact with computing device 700. In some embodiments, input module 760 can be included in a user interface subsystem. For example, to allow a user to input data into and/or manipulate data within computing device 700.

Processor 710 can detect that the user has requested a route based on the origin and destination, and can define a best or optimal (or other) route or path. After processor 710 has defined the route, processor 710 can display the route at, for example, display module 740. For example, processor 710 can display a map at display module 740 and show the route as a high contrast color such that the user can identify the route on the map. In some embodiments, processor 710 can display the route as a series of textual instructions or directions at display module 740. In some embodiments, computing device 700 can include an audio processor and a speaker (not shown) operatively coupled to processor 710, and output the route as a series of voice commands or directions. Processor 710 can coordinate the output of directions (either voice command or textual instructions) with the current position of computing device 700 received from a GPS module (not shown) operatively coupled to processor 710. In other words, computing device 700 can provide turn-by-turn (or street-by-street) instructions as the user navigates the route.

Figure 8:
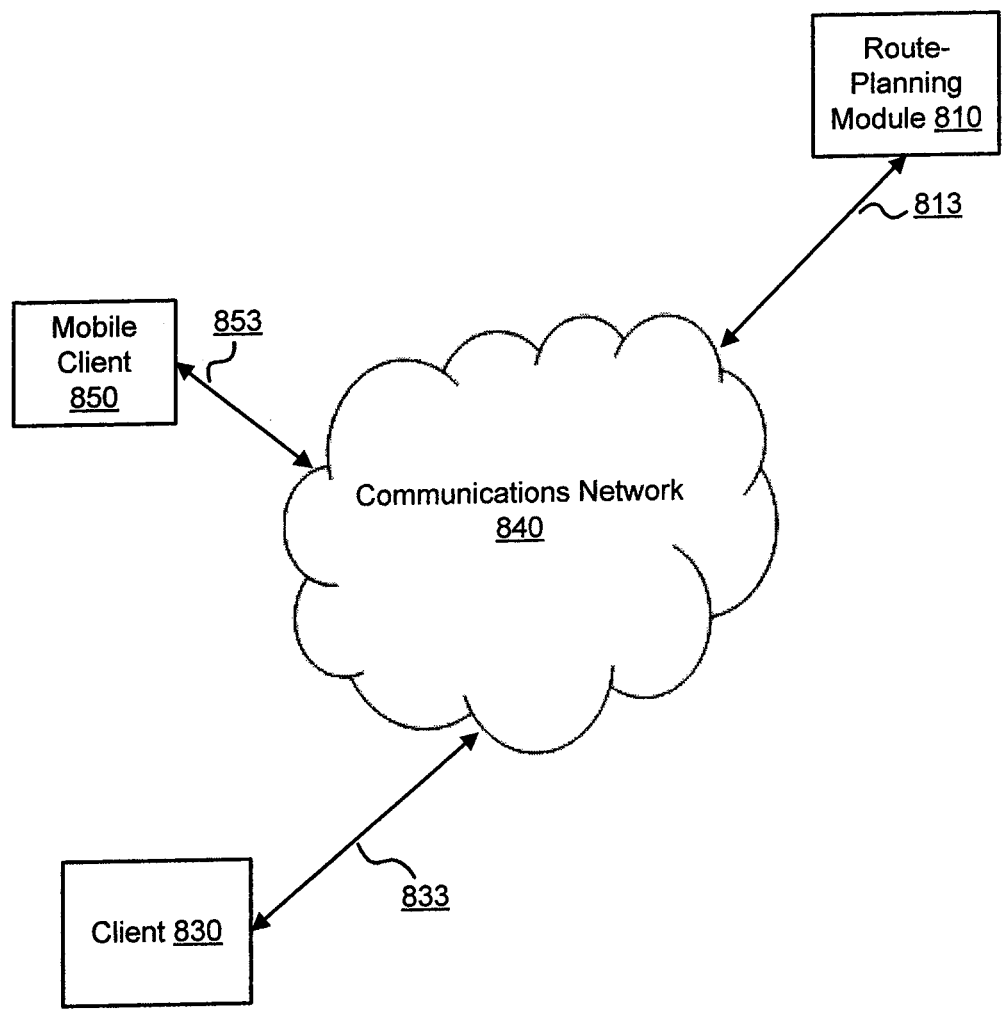
FIG. 8 is a system block diagram of a system for determining a path, according to an embodiment.

A computing device can be a client of a route-planning module via a network. The client can request a route from an origin to a destination, and the route-planning module can determine a path such as a best or optimal path from the origin to the destination, and send the path to the client. FIG. 8 is a system block diagram of a system for determining a path, according to an embodiment. Communications network 840 can be any communication network configurable to allow route-planning module 810, client 830 and mobile client 850 to communicate with communications network 840 and/or to each other through communications network 840. In other words, communications network 840 can be any network or combination of networks capable of transmitting information (e.g., data and/or signals) including, for example, a telephone network, an Ethernet network, a fiber-optic network, a wireless network, and/or a cellular network.

Communications network 840 can include multiple networks operatively coupled one to another by, for example, network bridges, routers, switches and/or gateways. For example, mobile client 850 can be operatively coupled to a cellular network, route-planning module 810 can be operatively coupled to an Ethernet network, and client 830 can be operatively coupled to a fiber-optic network. The cellular network, Ethernet network and fiber-optic network can each be operatively coupled one to another via one or more network bridges, routers, switches and/or gateways such that the cellular network, the Ethernet network and the fiber-optic network are operatively coupled to form collectively a communication network. Alternatively, for example, the cellular network, the Ethernet network and the fiber-optic network can each be operatively coupled to the Internet such that the cellular network, the Ethernet network, the fiber-optic network and the Internet are operatively coupled to form collectively a communication network.

As illustrated in FIG. 8, route-planning module 810 is operatively coupled to communications network 840 via network connection 813; client 830 is operatively coupled to communications network 840 via network connection 833; and mobile client 850 is operatively coupled to communications network 840 via network connection 853. Network connections 813, 833 and 853 can be any appropriate network connection for operatively coupling route-planning module 810, client 830 and mobile client 850, respectively, to communications network 840.

A network connection can be a wireless network connection such as, for example, a wireless fidelity ("Wi-Fi") or wireless local area network ("WLAN") connection, a wireless wide area network ("WWAN") connection, and/or a cellular connection. In some embodiments, a network connection can be a cable connection such as, for example, an Ethernet connection, a digital subscription line ("DSL") connection, a broadband coaxial connection, and/or a fiber-optic connection. In some embodiments, a mobile client, a route-planning module and/or a client can be operatively coupled to a communication network by heterogeneous network connections. For example, a mobile client can be operatively coupled to the communication network by a WWAN network connection, a client can be operatively coupled to the communication network by a DSL network connection, and a route-planning module can be operatively coupled to the communication network by a fiber-optic network connection.

Route-planning module 810, client 830, and/or mobile client 850 includes (not shown) a processor, a network interface module, and a memory. For example, route-planning module 810 can be operatively coupled to communications network 840 via a network interface module and network connection 833. The network interface module can be any network interface configurable to be operatively coupled to communications network 840 via network connection 833. For example, a network interface module can be a wireless interface module such as, for example, a worldwide interoperability for microwave access ("Wi-MAX") interface module, a high-speed packet access ("HSPA") interface module, and/or a WLAN interface module. A network interface can also be, for example, an Ethernet interface module, a broadband interface module, a fiber-optic interface module, and/or a telephony interface module.

In some embodiments, one or more of route-planning module 810, client 830, and/or mobile client 850 are a virtual device implemented in software such as, for example, a virtual machine executing on or in a processor. For example, a content server can be a software module executing in a virtual machine environment such as, for example, a Java™ module executing in a Java™ Virtual Machine ("JVM"), or an operating system executing in a VMware™ virtual machine. In some such embodiments, a network interface module, a processor, and a memory can be virtualized and implemented in software executing in, or as part of, a virtual machine.

Route-planning module 810 can be a hardware module such configured to receive requests for routes (or paths) from an origin to a destination. For example, route-planning module 810 can be a computer server executing software configured to receive a route request from mobile client 850 and/or client 830, determine a best or optimal route from an origin to a destination in response to the route request, and send the best route (or information related to the best route such as a list of directions defining the best route) to mobile client 850 and/or client 830. In some embodiments, route-planning module 810 can provide an interface such as a web page accessible to mobile client 850 and/or client 830 via, for example, a web browser. The interface can include text or edit boxes in which a user of mobile client 850 and/or client 830 can enter an origin and a destination for a route, and can send a route request including the origin and destination by, for example, clicking on a button within the web page. Route-planning module 850 can receive the route request (including the origin and destination), calculate an optimal route, and provide a web page to the user of the mobile client 850 and/or client 830 including a visual or graphical representation of the optimal route and/or a textual description of the optimal route.

A visual representation of the optimal route can include, for example, a map of optimal route an surrounding areas in which the optimal route is highlighted such that it is identifiable to the user. A textual representation of the optimal route can be, for example, a list of directions (e.g., street names, compass directions, and/or turn information) for following the optimal route from the source to the destination.

In some embodiments, route-planning module 810 can be a dedicated route-planning appliance. In other words, route-planning module 810 can be an application-specific hardware device configured to determine best or optimal routes in response to route requests from mobile client 850 and/or client 830.

Route-planning module 810 can be configured to implement or execute a process for defining a route or selecting a route (or path) as described herein. For example, route-planning module 810 can implement process 500 as described in relation to FIG. 5. In some embodiments, route-planning module 810 can implement a process as described in relation to FIGS. 6A-6F.

Client 830 can be a computer such as a desktop computer, a laptop computer, or some other computing device. For example, client 830 can be a desktop computer including a web browser configurable to access a web page provided by route-planning module 810 (or a computer server in communication with route-planning module 810). In some embodiments, client 830 can be a desktop computer running a routing or mapping application that is configured to communicate with route-planning module 810 via communications network 840 to determine routes (such as best or optimal routes) between origins and destinations.

Mobile client 850 can be a GPS module or device in communication with route-planning module 810. Mobile client 850 can provide its current location and a destination to route-planning module 810 via communications network 840, and route-planning module 810 can provide mobile client 850 with a route to the destination from the current location of mobile device 853. In other words, the current location or GPS coordinates associated with the current location of mobile client 850 can be used as an origin of a route. Mobile client 850 can be a cellular phone such as a smartphone, a PDA, a portable computer such as a notebook computer or palmtop computer, and/or some other mobile device. In some embodiments, such mobile device can include a GPS module configured to provide a current location (or origin) to route-planning module. In some embodiments, a user of mobile client 850 can enter a current location such as, for example, an address or intersection as an origin for a route. Similarly, a user of mobile client 850 can input a destination of the route, and can request (e.g., by clicking on a button or entering a command at mobile client 850) from route-planning module 810 a route from the origin to the destination.

Figure 9:
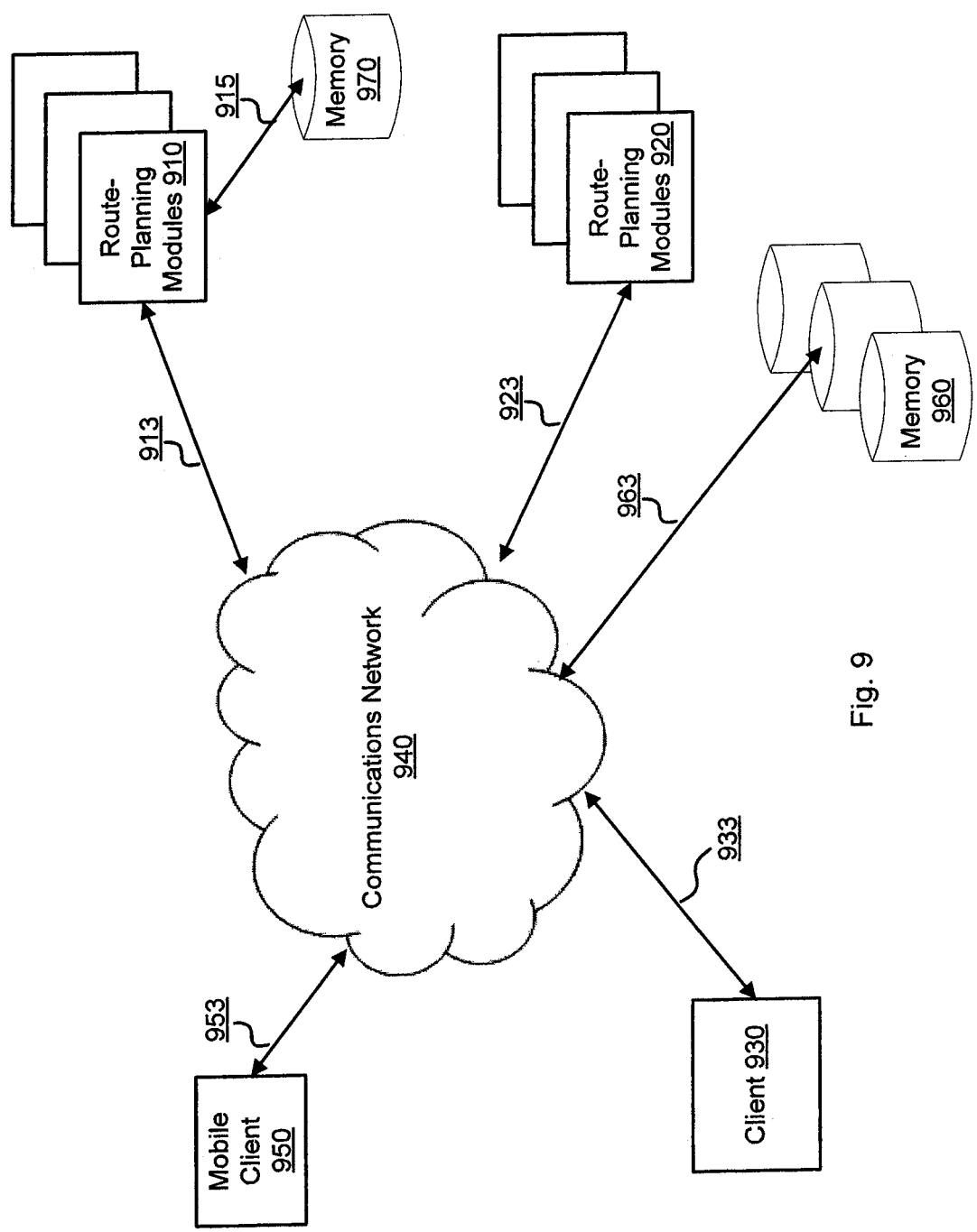
FIG. 9 is a system block diagram of another system for determining a path, according to an embodiment.

A system for determining a path or route can include multiple route-planning modules and/or memory such as databases accessible to the route-planning module. FIG. 9 is a system block diagram of another system for determining a path, according to an embodiment. FIG. 9 illustrates client module 950 operatively coupled to communications network 940 via network connection 953, and client 930 operatively coupled to communications network 940 via network connection 933. Mobile client 950 and network connection 953 are analogous to mobile client 850 and network connection 853, respectively. Similarly, client 930 and network connection 933 are analogous to client 830 and network connection 833, respectively. FIG. 9 also illustrates route-planning module 910 operatively coupled to communications network 940 via network connection 913, and route-planning module 920 operatively coupled to communications network 940 via network connection 923. In some embodiments, network connection 913 and/or network connection 923 are multiple network connections, and each routing planning module or route-planning modules 910 and 920 are operatively coupled to communications network 940 via network connections 913 and network connections 923. Route-planning module 910 and route-planning module 920 are analogous to route-planning module 810, and network connections 913 and 923 are analogous to network connection 813.

Multiple route-planning modules can be advantageous for a variety of purposes and in a variety of embodiments. For example, in some embodiments, multiple route-planning modules can be used to distribute processing across a number of processors and/or computer servers to balance the processing or planning of routes or paths. Multiple route-planning modules can be distributed geographically to increase reliability, and/or speed of access to the route-planning modules by clients. Multiple route-planning module can be used to provide redundant route-planning module such that a client can access a secondary, tertiary, etc. route-planning module if a primary route-planning module is unavailable due to a communications network failure or outage, or maintenance of a preferred (e.g., primary, secondary, etc.) route-planning module.

Memory 970 is operatively coupled to route-planning modules 910 via connection 915. Connection 915 can be any connection such as, for example, a network connection, fiber channel connection, small computer system interconnect connection, and/or an external serial AT attachment connection configured to operatively coupled memory 970 to route-planning module 910. Memory 970 can be, for example, a database configured to store one or more graphs accessible to route-planning modules 910. For example, memory 970 can be configured as a relational database accessible to route-planning module 910 such that route-planning module 910 can query the database, add records to the database, remove records from the database, and/or modify records on the database. Such records can represent, for example, nodes and/or edges of a graph related to intersections and/or street segments of a traffic system. Additionally, records can include historical traffic delay information such as traffic delay probability distributions, mean travel times, and variances of travel times related to intersections and/or street segments of a traffic system. In some embodiments, historical traffic delay information can be indexed by day, day of the week, month, time of day, holiday, and/or other temporal indices.

Route-planning modules 910 can access the graphs, historical traffic delay information, and/or other information stored at memory 970 to determine routes or paths from an origin to a destination. In some embodiments, memory such as memory 960 is accessible to route-planning modules 910 and/or route-planning modules 920 via communications network 940. Memory 960 is operatively coupled to communications network 940 via network connection 963, which is analogous to other network connections discussed herein. Memory 960 can be similar to memory 970, but can additionally be accessed via communications network 940 such that route-planning modules that are not directly operatively coupled to memory 960 can access a database and/or other information at memory 960 via communications network 940.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments, features of one module described herein can be included in another module to reduce the number of discrete components of an apparatus. Additionally, in some embodiments, for example, some modules described herein can be implemented in software or code executing on a processor and other modules can be implemented in hardware such as application-specific semiconductor chips.

What is claimed is:

1. A computer-implemented method of selecting a best route from an origin to a destination based on an inputted arrival time, the method comprising:
   with a computer, determining a set of possible routes from the origin to the destination using traffic delay probability distributions;
   organizing the set of possible routes into a plurality of subsets of possible routes based on at least one parameter;
   removing from consideration at least a first subset of possible routes by determining, without analyzing all the possible routes of the first subset of possible routes, that the first subset of possible routes cannot include the best route, comprising:
      selecting a representative route to represent the first subset of possible routes;
      comparing the representative route with a route that was previously selected based on cost analysis; and
      determining that the representative route has a greater cost than the route that was previously selected based on cost analysis;
   analyzing possible routes of subsets of possible routes that are not removed from consideration to determine respective costs of those possible routes;
   selecting the best route from the analyzed possible routes based on cost and the inputted arrival time at the destination; and
   presenting the best route on an interface.

2. The method of claim 1, wherein removing the first subset of possible routes from consideration comprises:
   in a search space of possible routes, where a first route has a smallest value of a first parameter in the search space and a second route has a smallest value of a second parameter in the search space, defining a first region of said search space bounded by a first point defined by the first parameter value and the second parameter value of the first route, a selected current point corresponding to the route that was previously selected based on cost analysis, the selected current point defined by the first parameter value and the second parameter value, and a first probe point that represents a best possible route with the smallest value of the first parameter;
   comparing said first probe point with the selected current point; and
   in response to determining that the selected current point is more optimal than the first probe point, rejecting the first region and all points within the first region as non-optimal.

3. The method of claim 2, comprising: determining whether to search a partition by comparing a parametric optimization parameter with at least one of an upper and a lower bound.

4. The method of claim 3 wherein the upper bound or the lower bound is defined in terms of mean and variance of analyzed routes.

5. The method of claim 1 wherein selecting the best route from the analyzed possible routes based on the inputted arrival time at the destination comprises maximizing probability of reaching the destination by a deadline, maximizing probability of arriving at the destination within a specified duration given a desired time window in which to depart and a desired travel time duration, or minimizing travel time such that probability of reaching the destination is at least a specified desired probability given a desired time at which to depart and a desired probability of reaching the destination.

6. The method of claim 1, further comprising:
   defining a first subset of routes and a second subset of routes from the set of possible routes from the origin to the destination;
   representing the first subset of routes with a first probe point;
   representing the second subset of routes with a second probe point;
   determining that the first subset of routes can include a more optimal route than a current optimal route corresponding to the route that was previously selected based on cost analysis, and that the second subset of routes cannot include a more optimal route than the current optimal route; and
   discarding the second subset of routes in response.

7. The method of claim 1, further comprising:
   receiving a route-planning request from a client via a network, the route-planning request including the origin and the destination.

8. The method of claim 1 comprising a database of statistics including a mean value and a variance value, said statistics associated with road segments; and
iteratively:

selecting a search region;
deciding a value of a search parameter; and
comparing a probe point of the search region with a current optimal route corresponding to the route that was previously selected based on cost analysis;
finding a route using the search parameter;
defining a new current optimal route;
defining the new regions based on the new current optimal route; and
storing the new regions.

9. The method of claim 1 comprising a database of statistics including a mean value and a variance value, said statistics associated with road segments; and
iteratively:
selecting a search region;
deciding a value of a search parameter; and
comparing the search parameter with a bound of the parameter;
finding a route using the search parameter;
defining a new current optimal route;
defining the new regions based on the new current optimal route; and
storing the new regions.

10. The method of claim 1 comprising a database of statistics including a mean value and a variance value, said statistics associated with road segments; and
iteratively:
selecting a search region;
deciding a value of a search parameter;
comparing a probe point of the search region with a current optimal route;
comparing the search parameter with a bound of the parameter;
finding a route using the search parameter;
defining a new current optimal route;
defining new regions based on the new current optimal route; and
storing the new regions.

11. The method of claim 1 wherein statistically related street segments are combined into groups such that delay characteristics are preserved without losing information about alternate path segments, and wherein the statistically related street segments comprise street segments that have at least one of similar statistical parameters and similar probabilistic parameters.

12. The method of claim 11 further comprising:
determining some road segments as group candidates; and
assigning a portion of group candidates into a group.

13. The method of claim 12 wherein the group candidates are determined by the number of samples of traffic data.

14. The method of claim 12 wherein a group is defined by a list of multiple consecutive road segments that are bounded by junctions of group candidates.

15. A non-transitory computer readable medium having computer readable code thereon for selecting a best route from an origin to a destination based on an inputted arrival time, the medium comprising instructions for:
determining a set of possible routes from the origin to the destination using traffic delay probability distributions;
organizing the set of possible routes into a plurality of subsets of possible routes based on at least one parameter;
removing from consideration at least a first subset of possible routes by determining, without analyzing all the possible routes of the first subset of possible routes, that the first subset of possible routes cannot include the best route, comprising:
selecting a representative route to represent the first subset of possible routes;
comparing the representative route with a route that was previously selected based on cost analysis; and
determining that the representative route has a greater cost than the route that was previously selected based on cost analysis;
analyzing possible routes of subsets of possible routes that are not removed from consideration to determine respective costs of those possible routes;
selecting the best route from the analyzed possible routes based on cost and the inputted arrival time at the destination; and
presenting the best route on an interface.

16. The computer readable medium of claim 15, removing the first subset of possible routes from consideration comprises:
in a search space of possible routes, where a first route has a smallest value of a first parameter in the search space and a second route has a smallest value of a second parameter in the search space, defining a first region of said search space bounded by a first point defined by the first parameter value and the second parameter value of the first route, a selected current point corresponding to the route that was previously selected based on cost analysis, the selected current point defined by the first parameter value and the second parameter value, and a first probe point that represents a best possible route with the smallest value of the first parameter;
comparing said first probe point with the selected current point; and
in response to determining that the selected current point is more optimal than the first probe point, rejecting the first region and all points within the first region as non-optimal.

17. The computer readable medium of claim 16, comprising: determining whether to search a partition by comparing a parametric optimization parameter with at least one of an upper and a lower bound.

18. The computer readable medium of claim 17 wherein the upper bound is defined in terms of mean and variance of analyzed routes.

19. The computer readable medium of claim 15 wherein selecting the best route from the analyzed possible routes based on the inputted arrival time at the destination comprises maximizing probability of reaching the destination by a deadline, maximizing probability of arriving at the destination within a specified duration given a desired time window in which to depart and a desired travel time duration, or minimizing travel time such that probability of reaching the destination is at least a specified desired probability given a desired time at which to depart and a desired probability of reaching the destination.

20. The computer readable medium of claim 15, further comprising:
defining a first subset of routes and a second subset of routes from the set of possible routes from the origin to the destination;
representing the first subset of routes with a first probe point;
representing the second subset of routes with a second probe point;
determining that the first subset of routes can include a more optimal route than a current optimal route corresponding to the route that was previously selected based on cost analysis, and that the second subset of routes cannot include a more optimal route than the current optimal route; and discarding the second subset of routes in response.

21. The computer readable medium of claim 15, further comprising:

receiving a route-planning request from a client via a network, the route-planning request including the origin and the destination.

22. The computer readable medium of claim 15 comprising a database of statistics including a mean value and a variance value, said statistics associated with road segments; and iteratively:

selecting a search region;
deciding a value of a search parameter; and
comparing a probe point of the search region with a current optimal route corresponding to the route that was previously selected based on cost analysis;
finding a route using the search parameter;
defining a new current optimal route;
defining the new regions based on the new current optimal route; and
storing the new regions.

23. The computer readable medium of claim 15 comprising a database of statistics including a mean value and a variance value, said statistics associated with road segments; and iteratively:

selecting a search region;
deciding a value of a search parameter; and
comparing the search parameter with a bound of the parameter;
finding a route using the search parameter;
defining a new current optimal route;
defining the new regions based on the new current optimal route; and
storing the new regions.

24. The computer readable medium of claim 15 comprising a database of statistics including a mean value and a variance value, said statistics associated with road segments; and iteratively:

selecting a search region;
deciding a value of a search parameter;
comparing a probe point of the search region with a current optimal route;
comparing the search parameter with a bound of the parameter;
finding a route using the search parameter;
defining a new current optimal route;
defining new regions based on the new current optimal route; and
storing the new regions.

25. The computer readable medium of claim 15 wherein statistically related street segments are combined into groups such that delay characteristics are preserved without losing information about alternate path segments, and wherein the statistically related street segments comprise street segments that have at least one of similar statistical parameters and similar probabilistic parameters.

26. The computer readable medium of claim 25 further comprising:

determining some road segments as group candidates; and
assigning a portion of group candidates into a group.

27. The computer readable medium of claim 26 wherein the group candidates are determined by the number of samples of traffic data.

28. The computer readable medium of claim 26 wherein a group is defined by a list of multiple consecutive road segments that are bounded by junctions of group candidates.

29. An apparatus comprising:

a memory;
a processor;
a communications interface; and
an interconnection mechanism coupling the memory, the processor and the communications interface;
wherein the memory comprises an application that selects a best route from an origin to a destination based on an inputted arrival time when performed on the processor, the apparatus performing operations comprising:
determining a set of possible routes from the origin to the destination using traffic delay probability distributions;
organizing the set of possible routes into a plurality of subsets of possible routes based on at least one parameter;
removing from consideration at least a first subset of possible routes by determining, without analyzing all the possible routes of the first subset of possible routes, that the first subset of possible routes cannot include the best route, comprising:
selecting a representative route to represent the first subset of possible routes;
comparing the representative route with a route that was previously selected based on cost analysis; and
determining that the representative route has a greater cost than the route that was previously selected based on cost analysis;
analyzing possible routes of subsets of possible routes that are not removed from consideration to determine respective costs of those possible routes;
selecting the best route from the analyzed possible routes based on cost and the inputted arrival time at the destination; and
presenting the best route on an interface.

30. The apparatus of claim 29, wherein removing the first subset of possible routes from consideration comprises:

in a search space of possible routes, where a first route has a smallest value of a first parameter in the search space and a second route has a smallest value of a second parameter in the search space, defining a first region of said search space bounded by a first point defined by the first parameter value and the second parameter value of the first route, a selected current point corresponding to the route that was previously selected based on cost analysis, the selected current point defined by the first parameter value and the second parameter value, and a first probe point that represents a best possible route with the smallest value of the first parameter;
comparing said first probe point with the selected current point; and
in response to determining that the selected current point is more optimal than the first probe point, rejecting the first region and all points within the first region as non-optimal.

31. The apparatus of claim 30, comprising: determining whether to search a partition by comparing a parametric optimization parameter with at least one of an upper and a lower bound.

32. The apparatus of claim 31 wherein the upper bound or the lower bound is defined in terms of mean and variance of analyzed routes.

33. The apparatus of claim 29 wherein selecting the best route from the analyzed possible routes based on the inputted arrival time at the destination comprises maximizing probability of reaching the destination by a deadline, maximizing probability of arriving at the destination within a specified duration given a desired time window in which to depart and a desired travel time duration, or minimizing travel time such that probability of reaching the destination is at least a specified desired probability given a desired time at which to depart and a desired probability of reaching the destination.

34. The apparatus of claim 29, further comprising:
defining a first subset of routes and a second subset of routes from the set of possible routes from the origin to the destination;
representing the first subset of routes with a first probe point;
representing the second subset of routes with a second probe point;
determining that the first subset of routes can include a more optimal route than a current optimal route corresponding to the route that was previously selected based on cost analysis, and that the second subset of routes cannot include a more optimal route than the current optimal route; and
discarding the second subset of routes in response.

35. The apparatus of claim 29, further comprising:
receiving a route-planning request from a client via a network, the route-planning request including the origin and the destination.

36. The apparatus of claim 29 comprising a database of statistics including a mean value and a variance value, said statistics associated with road segments; and iteratively:
selecting a search region;
deciding a value of a search parameter; and
comparing a probe point of the search region with a current optimal route corresponding to the route that was previously selected based on cost analysis;
finding a route using the search parameter;
defining a new current optimal route;
defining the new regions based on the new current optimal route; and
storing the new regions.

37. The apparatus of claim 29 comprising a database of statistics including a mean value and a variance value, said statistics associated with road segments; and iteratively:
selecting a search region;
deciding a value of a search parameter; and
comparing the search parameter with a bound of the parameter;
finding a route using the search parameter;
defining a new current optimal route;
defining the new regions based on the new current optimal route; and
storing the new regions.

38. The apparatus of claim 29 comprising a database of statistics including a mean value and a variance value, said statistics associated with road segments; and iteratively:
selecting a search region;
deciding a value of a search parameter;
comparing a probe point of the search region with a current optimal route;
comparing the search parameter with a bound of the parameter;
finding a route using the search parameter;
defining a new current optimal route;
defining new regions based on the new current optimal route; and
storing the new regions.

39. The apparatus of claim 29 wherein statistically related street segments are combined into groups such that delay characteristics are preserved without losing information about alternate path segments, and wherein the statistically related street segments comprise street segments that have at least one of similar statistical parameters and similar probabilistic parameters.

40. The apparatus of claim 39 further comprising:
determining some road segments as group candidates; and
assigning a portion of group candidates into a group.

41. The apparatus of claim 40 wherein the group candidates are determined by the number of samples of traffic data.

42. The apparatus of claim 40 wherein a group is defined by a list of multiple consecutive road segments that are bounded by junctions of group candidates.

* * * * *